United States Patent
Tadano et al.

(10) Patent No.: US 10,892,695 B2
(45) Date of Patent: Jan. 12, 2021

(54) MOTOR DRIVE SYSTEM

(71) Applicant: Meidensha Corporation, Tokyo (JP)

(72) Inventors: Yugo Tadano, Tokyo (JP); Takao Akiyama, Tokyo (JP); Takashi Yamaguchi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 16/841,952

(22) Filed: Apr. 7, 2020

(65) Prior Publication Data
US 2020/0304050 A1 Sep. 24, 2020

Related U.S. Application Data

(63) Continuation of application No. 16/313,650, filed as application No. PCT/JP2017/010428 on Mar. 15, 2017.

(30) Foreign Application Priority Data

Jun. 27, 2016 (JP) .................................. 2016-126130

(51) Int. Cl.
*H02P 21/05* (2006.01)
*G01M 15/02* (2006.01)
(Continued)

(52) U.S. Cl.
CPC .............. *H02P 21/05* (2013.01); *G01M 15/02* (2013.01); *G05B 11/36* (2013.01); *G05B 11/42* (2013.01);
(Continued)

(58) Field of Classification Search
CPC ...... H02P 27/08; H02P 21/22; Y02T 10/7005; Y02T 10/643; B60L 15/025
See application file for complete search history.

(56) References Cited

U.S. PATENT DOCUMENTS 4,140,956 A 2/1979 Pritchard
5,886,491 A * 3/1999 Yoshida ............... G05B 13/024
318/592
(Continued)

FOREIGN PATENT DOCUMENTS

CN 102570956 A 7/2012
JP 11-206199 A 7/1999
(Continued)

OTHER PUBLICATIONS

Takao Akiyarna et al., "Shaft Torque Vibration Control of Drivetrain Bench," IEEJ Transactions on Electronics, Information and Systems, 2014 The Institute of Electrical Engineers of Japan, vol. 134 No. 7 pp. 909-916, 8 pages.
(Continued)

*Primary Examiner* — Zoheb S Imtiaz
(74) *Attorney, Agent, or Firm* — Servilla Whitney LLC

(57) ABSTRACT

A low-frequency torque controller 9 outputs a low-frequency torque controller output $\tau_{dc}^*$ based on a torque command value $\tau^*$ and a torque detection value $\tau_{det}$, and a vibrational torque controller 11 outputs a vibrational torque command value $\tau_{pd}^*$ based on the torque command value $\tau^*$, the torque detection value $\tau_{det}$, and a rotational phase detection value $\theta$. Meanwhile, in a high-frequency resonance suppression controller, an inverter torque command value $\tau_{inv}^*$ is outputted based on the torque detection value $\tau_{det}$ and a corrected torque command value $\tau_r^*$ obtained by adding the low-frequency torque controller output $\tau_{dc}^*$ to the vibrational torque command value $\tau_{pd}^*$. The invention thus provides shaft torque vibrational control of a motor drive system wherein engine vibrational torque command values including distortion components are tracked while entirely removing the influence of resonance, non-periodic disturbances, and periodic disturbances.

12 Claims, 10 Drawing Sheets

(51) Int. Cl.
*G05B 11/36* (2006.01)
*H02P 23/12* (2006.01)
*G05B 11/42* (2006.01)
*H02P 27/06* (2006.01)
*H02P 23/04* (2006.01)

(52) U.S. Cl.
CPC .............. *H02P 23/04* (2013.01); *H02P 23/12* (2013.01); *H02P 27/06* (2013.01); *H02P 2205/05* (2013.01)

(56) References Cited

U.S. PATENT DOCUMENTS

| | | | |
|---|---|---|---|
| 9,689,774 | B2 * | 6/2017 | Kanke .................. G01M 15/044 |
| 2002/0093836 | A1 | 7/2002 | Goepfrich et al. |
| 2013/0141027 | A1 * | 6/2013 | Nakata .................... H02P 27/08 318/400.23 |

FOREIGN PATENT DOCUMENTS

| | | |
|---|---|---|
| JP | 2003121287 A | 4/2003 |
| JP | 2009296752 A | 12/2009 |
| JP | 2011055583 A | 3/2011 |
| JP | 2011176950 A | 9/2011 |
| JP | 2011176951 A | 9/2011 |
| JP | 2014161189 A | 9/2014 |

OTHER PUBLICATIONS

English Translation of JP 2009296752 published Dec. 17, 2009, 15 pages.

* cited by examiner

[FIG. 1]
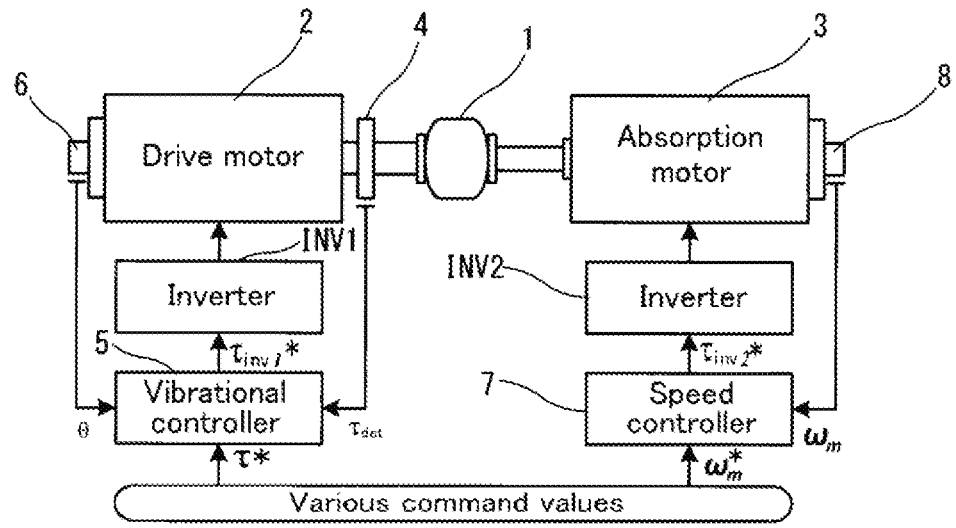
[FIG. 2]
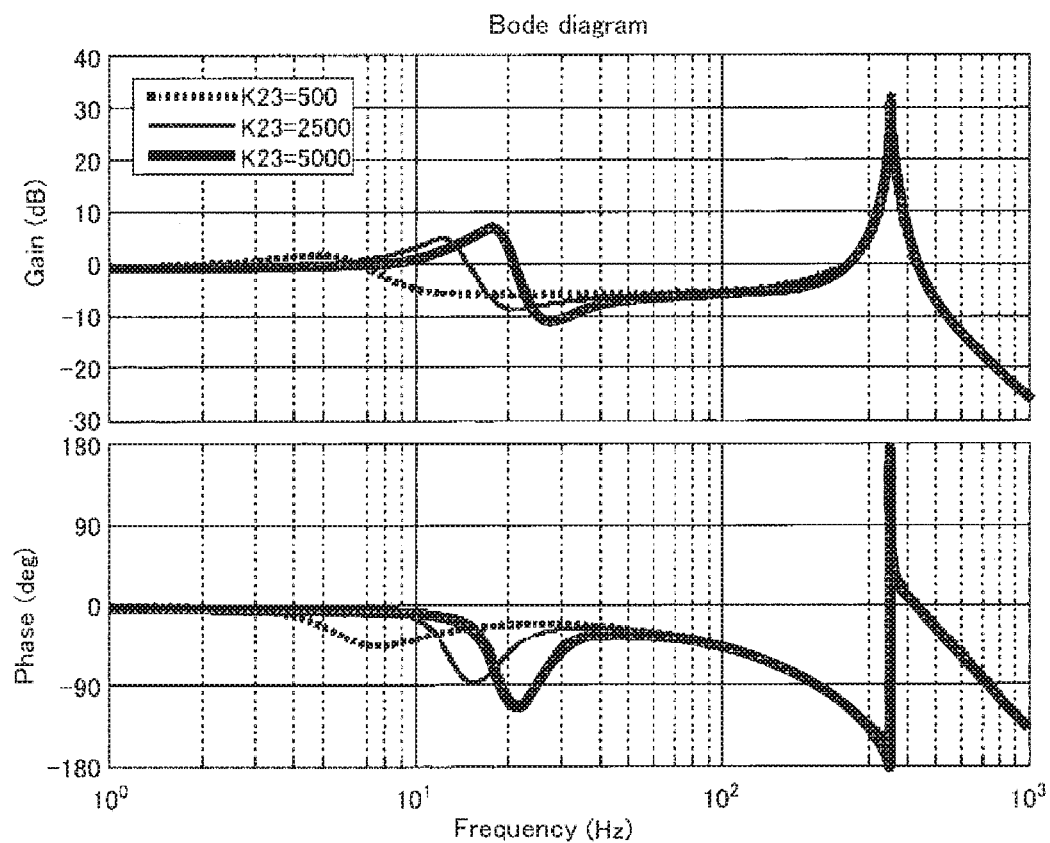

[FIG. 3]
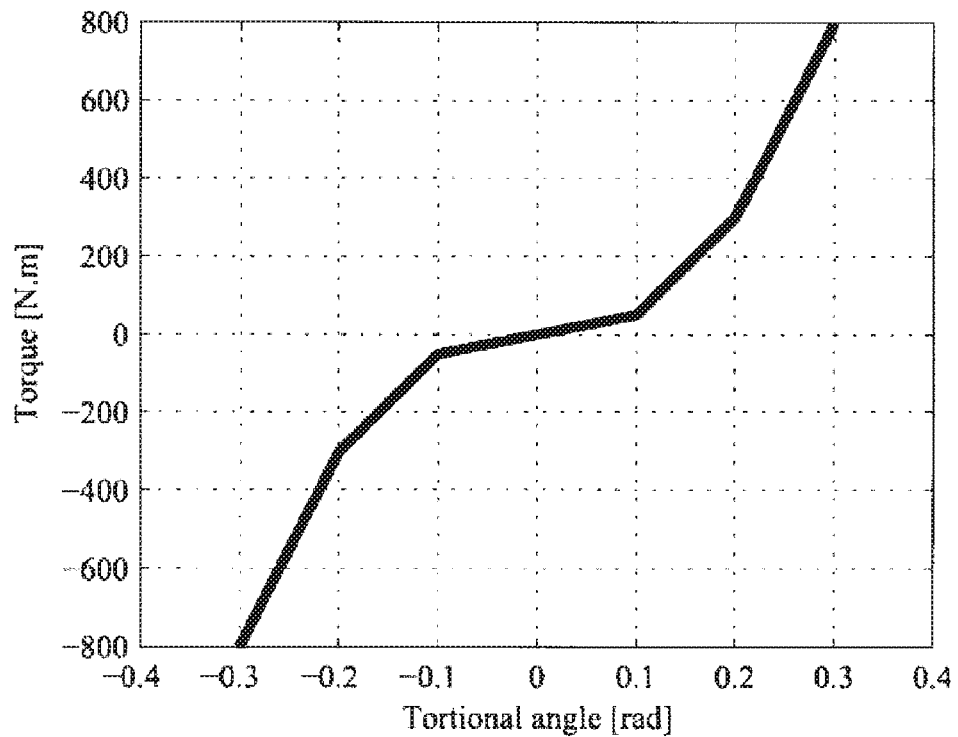
[FIG. 4]
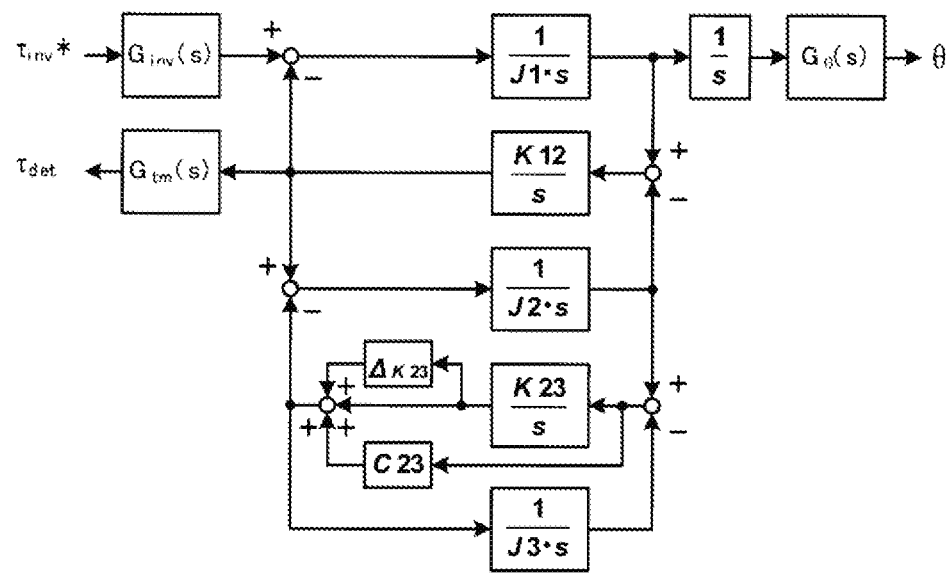

[FIG. 5]
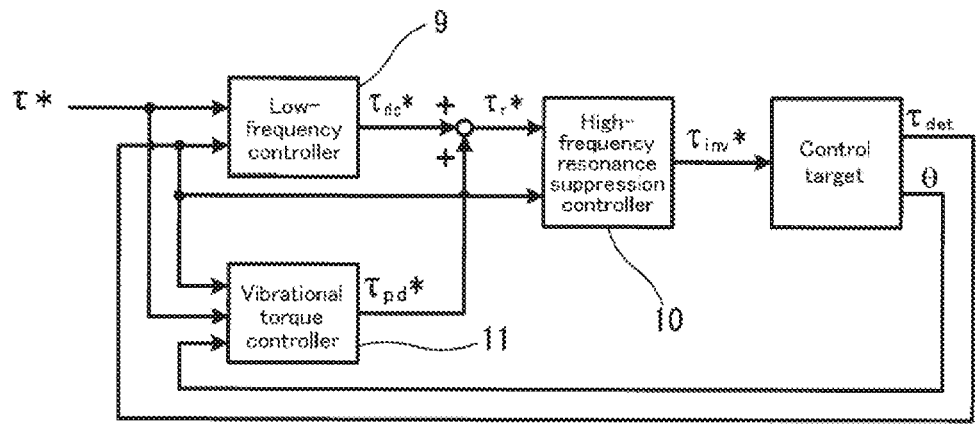
[FIG. 6]
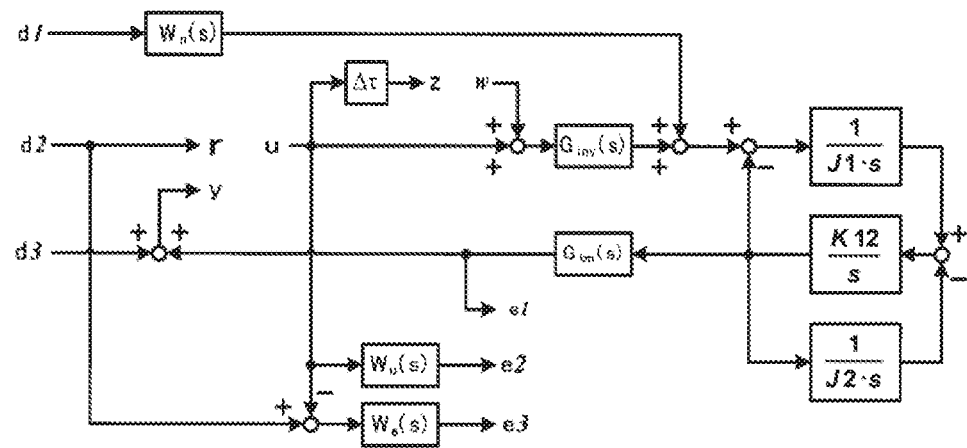

[FIG. 7]
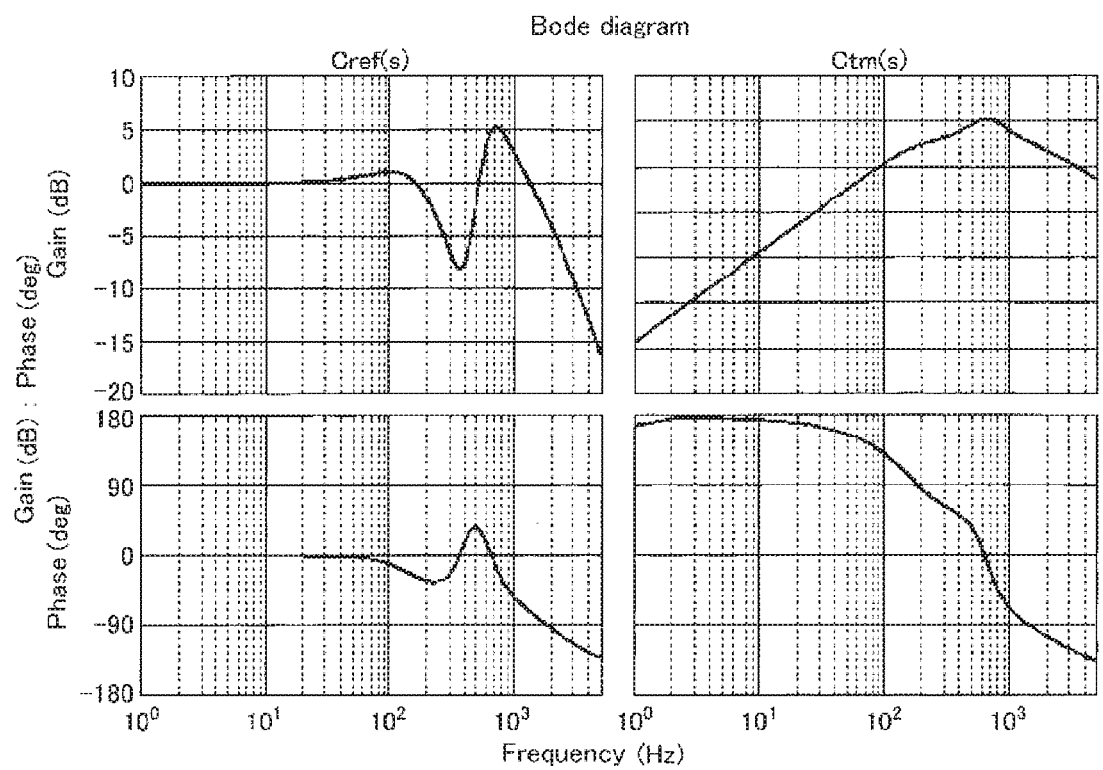
[FIG. 8]
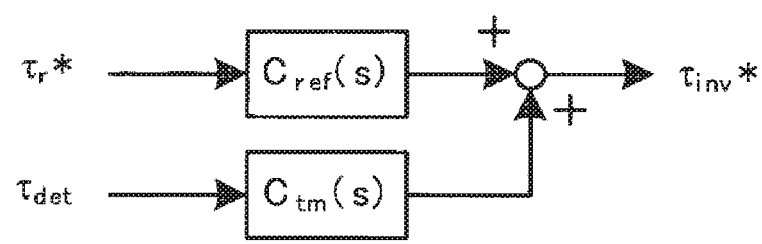

[FIG. 9]
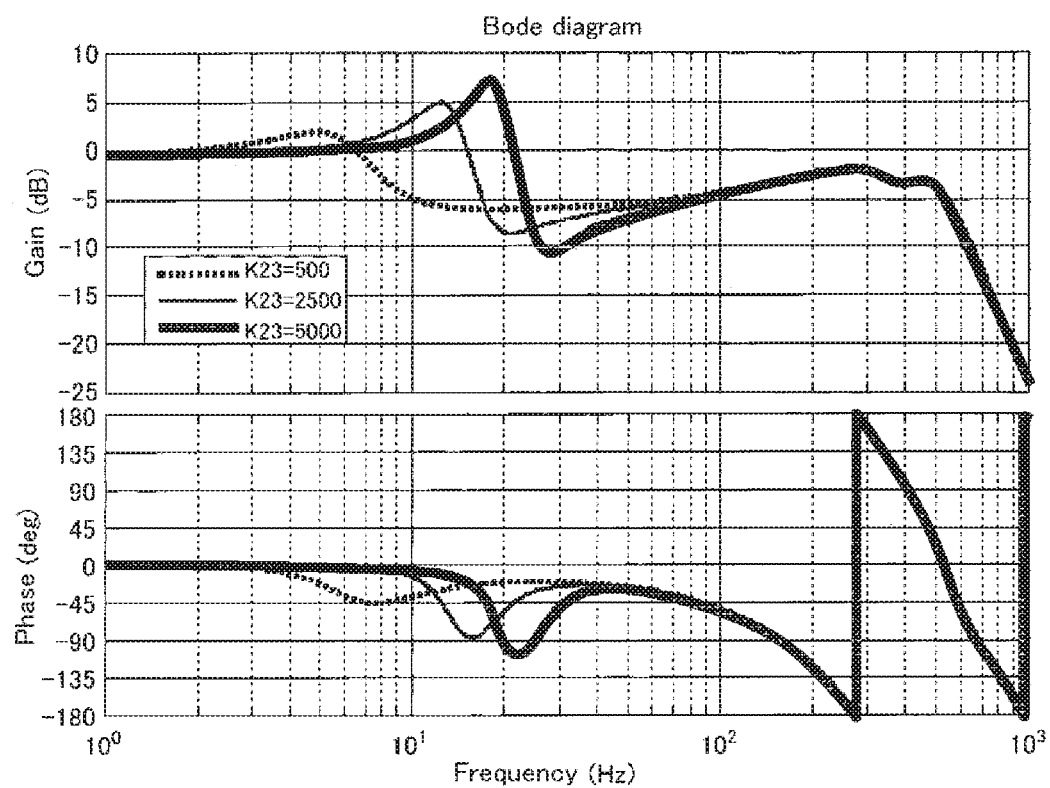
[FIG. 10]
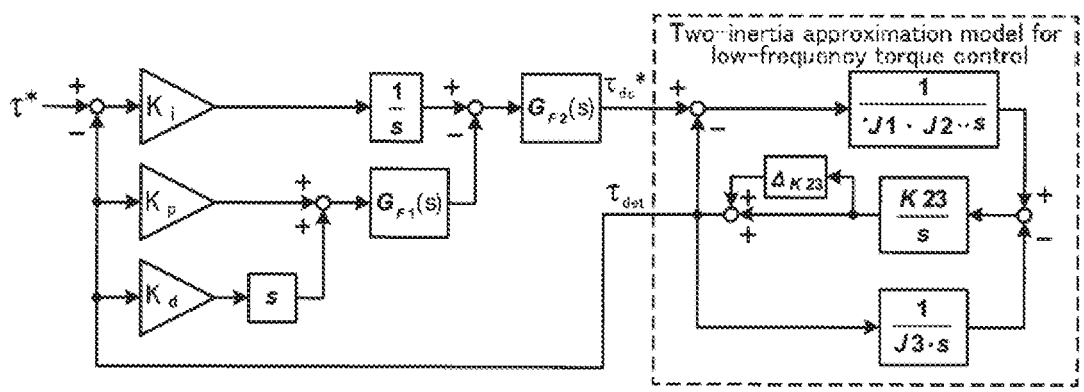

[FIG. 11]
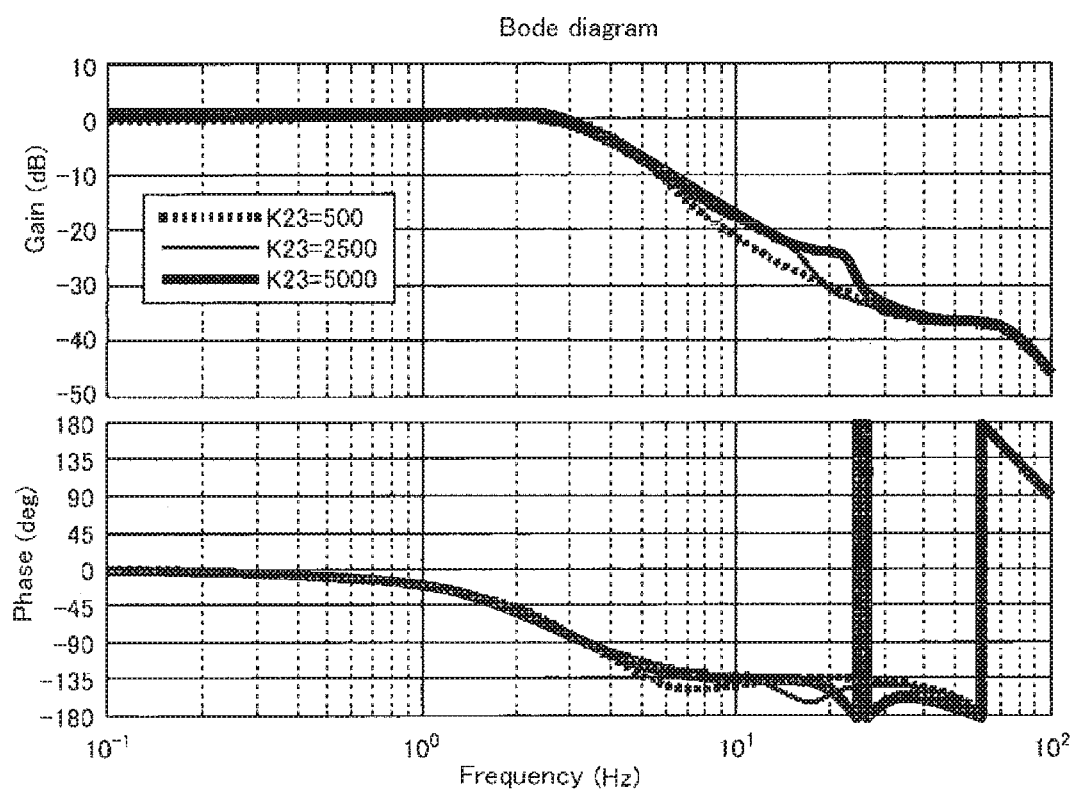

[FIG. 12]
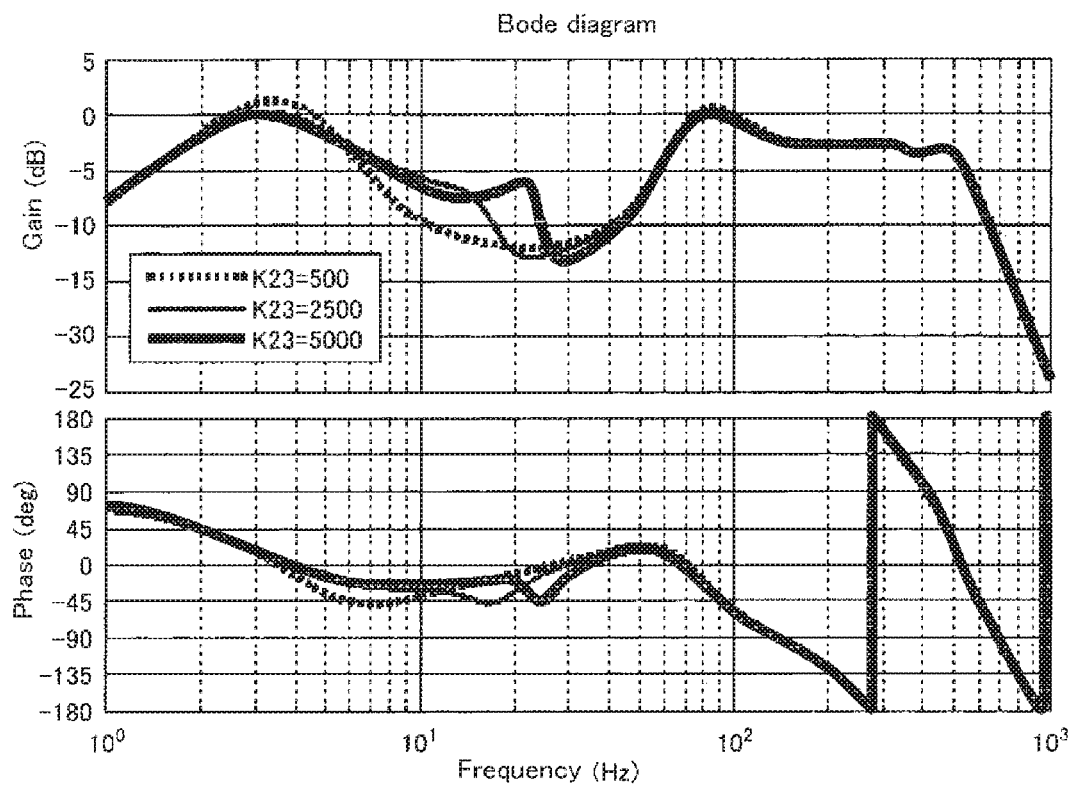
[FIG. 13]
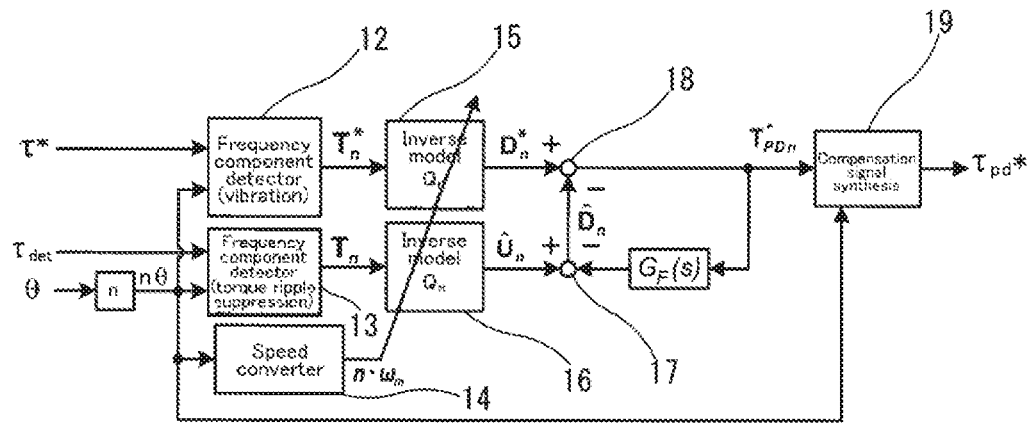

[FIG. 14]
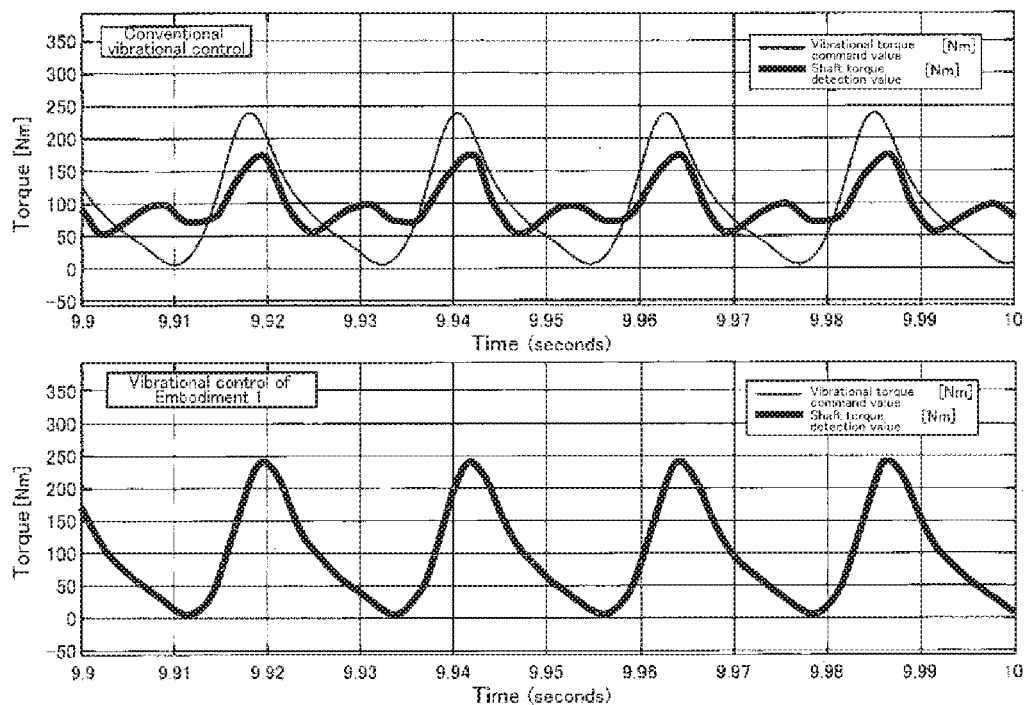
[FIG. 15]
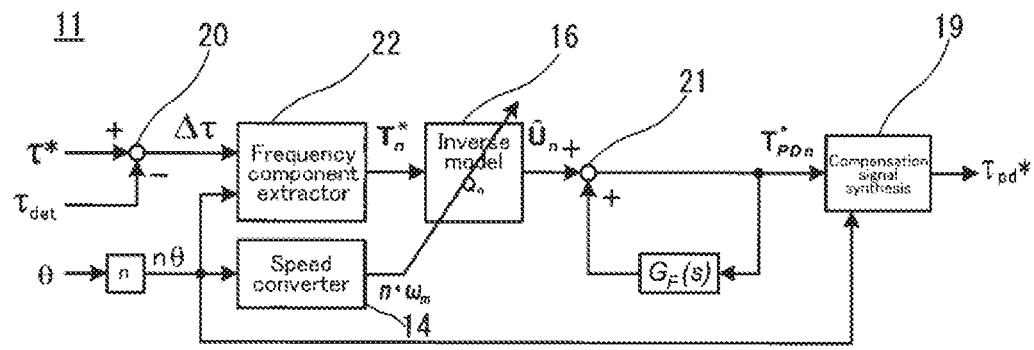

[FIG. 16]
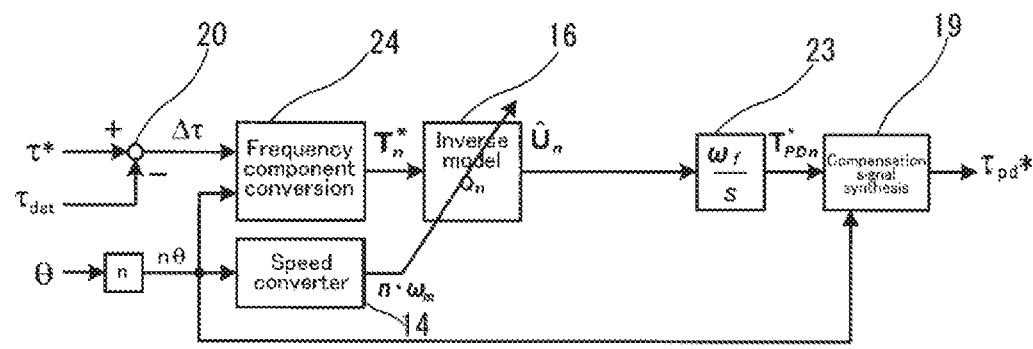
[FIG. 17]
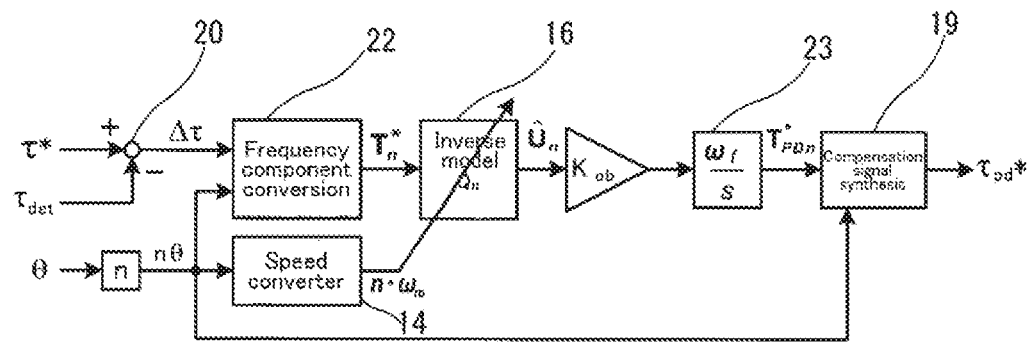

[FIG. 18]
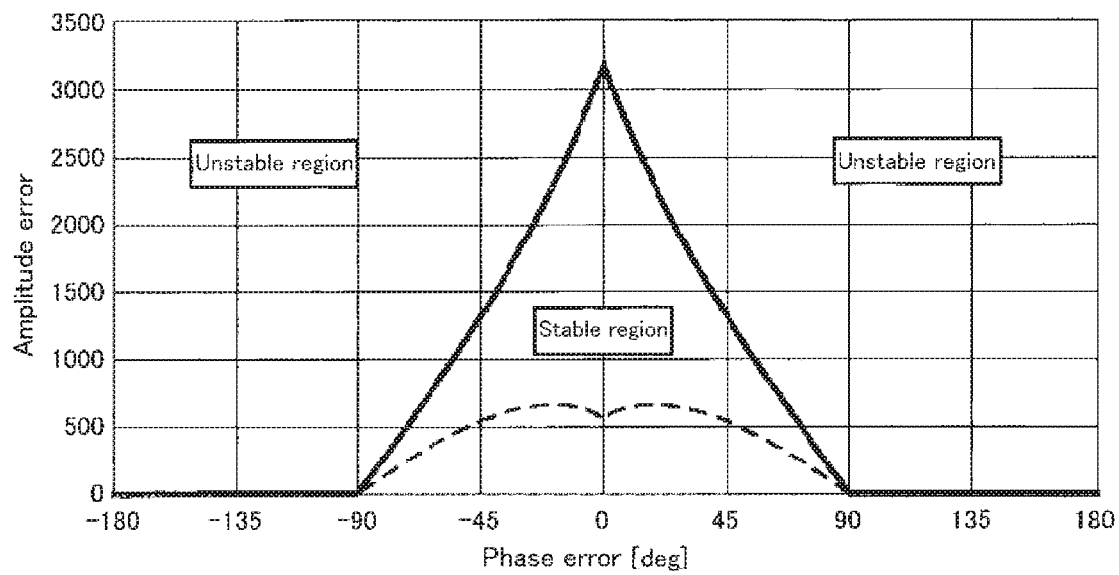
[FIG. 19]
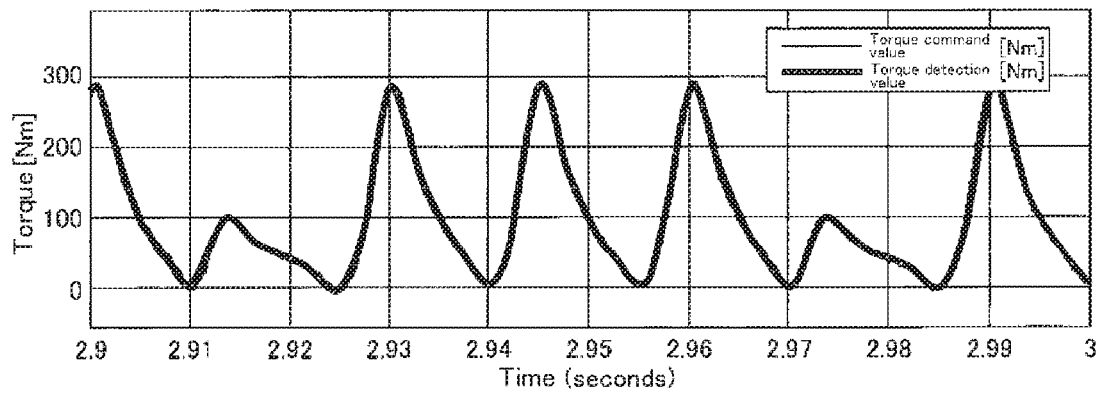

MOTOR DRIVE SYSTEM

CROSS-REFERENCE TO RELATED APPLICATIONS

This application is a continuation of U.S. application Ser. No. 16/313,650, which is the National Stage entry of PCT/JP2017/010428, filed on Mar. 15, 2017, which claims priority to Japanese Application No. 2016-126130, filed on Jun. 27, 2016, which are incorporated herein by reference in their entireties.

TECHNICAL FIELD

The present invention relates to a dynamometer system, particularly to vibrational control in a drivetrain bench, and to a control device and a control method for reproducing, with the shaft torque of a dynamometer, a complicated torque waveform in which pulses occur, as in an engine.

BACKGROUND ART

Non-Patent Document 1 discloses a system for controlling vibration amplitudes while implementing resonance suppression and low-frequency torque control in a drivetrain bench.

Patent Documents 1 and 2 disclose methods for performing vibrational control while implementing periodic disturbance suppression control in consideration of mechanical resonance.

In measurement control systems, such as dynamometer systems, for testing automobiles and automotive components, it is necessary not only to achieve stability of control, but also to simultaneously satisfy high-level demands such as those for high speed, high response, high capacity and high precision. As one type of hardware for satisfying these demands, a low-inertia motor that achieves high speeds and high response is sometimes used, forming a multiple-inertia resonance system together with the test piece. In such cases, shaft torsion resonance effects tend to occur at the locations for detection of shaft torque, which is the value being measured.

Additionally, periodic disturbances known as torque ripples tend to occur as a result of the circumstances of electromagnetic design and reductions in the number of motor poles due to specs-based and structural limitations. Such resonance and disturbances cause significant problems in testing and measuring devices, so it is essential to implement resonance suppression control and disturbance suppression control.

In particular, in drivetrain benches for testing vehicle drive system components such as various types of transmissions and torque converters in automobiles, it is necessary to simulate engine explosion torque waveforms by means of a motor drive system, and shaft torque vibrational control must be implemented across a wide range of frequency bands from the low-frequency region to the high-frequency region.

As a result thereof, resonance frequencies that occur in the mechanical system are included in the control band, thus requiring sophisticated shaft torque control in which the mechanical resonance is suppressed while also generating desired vibrational control components.

Non-Patent Document 1 discloses a shaft torque vibrational control method for a drivetrain bench. In a drivetrain bench, there is a low-frequency resonance point and a high-frequency resonance point. The low-frequency resonance is caused by nonlinear spring behavior in the torque converter, which is the test piece, and the high-frequency resonance is caused by rigidity in the drive motor, the shaft torque meter, and the mechanical system for coupling the above.

In order to simulate the vibrational torque in an engine, in shaft torque vibrational control, control is required so as to be able to obtain the desired vibration amplitude while suppressing the enlargement of vibrations due to the above-mentioned mechanical resonance.

Therefore, in Non-Patent Document 1, a shaft torque control method based on I-PD control is applied to low-frequency control, which depends largely on the nonlinear properties of the test piece, and resonance suppression control based on µ-synthesis is applied to the high-frequency resonance caused by the dynamometer equipment.

The document discloses a method for automatically adjusting the vibration amplitude so as to obtain a desired vibration amplitude for the shaft torque while implementing control in which these frequency bands are separated and combined.

However, this method is limited to vibrational control by a single frequency component, i.e. by a sine wave, and only the amplitude of that sine wave is controlled. Therefore, the phase of the sine wave is not controlled.

Furthermore, the actual explosion torque waveform of an engine is a distorted waveform in which multiple frequency components are mixed. Thus, in order to more precisely simulate engine explosion torque, it is necessary to simultaneously apply vibrations having multiple frequency components and to match not only the amplitude, but also the phase. This method in Non-Patent Document 1 is not able to achieve shaft torque vibrational control that simulates engine explosion torque including distortion components.

Additionally, while torque ripples that are generated as a result of motor structures exist as periodic disturbances, the periodic disturbances cannot be adequately suppressed by means of only resonance suppression control such as µ-synthesis, and they mix with the frequency components due to vibrational control, making shaft torque control more complicated. This Non-Patent Document 1 does not take the effects of such periodic disturbances into consideration. Thus, even if a sine-wave vibrational torque command is provided, unintended distortions will occur in the shaft torque, at frequency components different from those in the engine waveform.

In Patent Documents 1 and 2, the distortion components included in the engine explosion torque are also considered, and multiple periodic components are controlled by means of a generalized periodic disturbance observer. In order to suppress mechanical resonance, inverse properties of the torque transfer properties obtained by means of preliminary system identification are used, and they are installed as a resonance suppression table. As a result thereof, the influence of mechanical resonance and periodic disturbances (torque ripples) can be eliminated while leaving the vibration components in the respective frequency components.

However, the methods disclosed in Patent Documents 1 and 2 are for controlling only preset frequency components. Thus, the resonance suppression table only removes the influence of resonance that is due to the superimposition of applied vibration frequency components on the torque command value.

Therefore, when non-periodic disturbances such as torque sensor detection noise and the like are included, the influence of mechanical resonance remains in the shaft torque detection. Additionally, aside from the resonance suppression table, a system identification table for suppressing periodic disturbances is also necessary, so the amount of computation and amount of memory increase.

As mentioned above, a problem in shaft torque vibrational control of motor drive systems is that of tracking engine vibrational torque command values including distortion components while entirely removing the influence of resonance, non-periodic disturbances, and periodic disturbances.

RELATED ART

Patent Documents

Patent Document 1: JP 2011-176950 A
Patent Document 2: JP 2011-176951 A

Non-Patent Documents

Non-Patent Document 1: Akiyama, Ogawa, Sawada and Yamamoto, "Shaft Torque Vibration Control of Drivetrain Bench", IEEJ Transactions on Electronics, Information and Systems, Vol. 134, No. 7, pp. 909-916, 2014.

SUMMARY OF INVENTION

The present invention was proposed in consideration of the aforementioned conventional problem, and in one embodiment thereof, is characterized by being a motor drive system for controlling a shaft torque in a motor by using an inverter, wherein the motor drive system comprises a low-frequency torque controller for outputting a low-frequency torque controller output based on a torque command value and a torque detection value; a vibrational torque controller for outputting a vibrational torque command value based on the torque command value, the torque detection value, and a rotational phase detection value; and a high-frequency resonance suppression controller for outputting an inverter torque command value based on the torque detection value and a corrected torque command value obtained by adding the low-frequency torque controller output to the vibrational torque command value.

Additionally, one embodiment thereof is characterized in that the high-frequency resonance suppression controller has a μ-synthesis controller for adding an output obtained by subjecting the corrected torque command value to transfer properties from a μ-synthesis controller command value input to a μ-synthesis controller output, to an output obtained by subjecting the torque detection value to transfer properties from a μ-synthesis controller detection value input to a μ-synthesis controller output, and outputting an inverter torque command value; and the low-frequency torque controller implements PID control.

Additionally, one embodiment thereof is characterized in that the vibrational torque controller comprises a vibration frequency component extractor for outputting an nth-order frequency component vector of the vibrational torque command value based on the torque command value and an nth-order rotational phase obtained by multiplying, with the rotational phase detection value, an order n of a torque ripple frequency component and a vibration frequency component to be controlled; a ripple suppression frequency component extractor for outputting an nth-order frequency component vector of periodic disturbances based on the torque detection value and the nth-order rotational phase; a speed converter for outputting an nth-order rotational frequency based on the nth-order rotational phase; a first inverse model multiplication unit for multiplying, with an nth-order frequency component vector of the vibrational torque command value, an inverse model to which a single frequency vector synchronized with the nth-order rotational frequency has been applied, and outputting an nth-order frequency component vector of a vibration-induced periodic disturbance command value; a second inverse model multiplication unit for multiplying, with an nth-order frequency component vector of the periodic disturbances, an inverse model to which a single frequency vector synchronized with the nth-order rotational frequency has been applied, and outputting an nth-order frequency component vector of an operation amount estimate value; a first subtractor for subtracting, from the nth-order frequency component vector of the operation amount estimate value, a value obtained by passing an nth-order frequency component vector of the vibrational torque controller output through a low-pass filter, and outputting an nth-order frequency component vector of the periodic disturbance estimate value; a second subtractor for subtracting, from the nth-order frequency component vector of the vibration-induced periodic disturbance command value, the nth-order frequency component vector of the periodic disturbance estimate value, and outputting an nth-order frequency component vector of the vibrational torque controller output; and a compensation signal synthesis unit for outputting the vibrational torque command value based on the nth-order frequency component vector of the vibrational torque controller output and the nth-order rotational phase.

Additionally, one embodiment thereof is characterized in that the vibrational torque controller comprises a third subtraction unit for calculating a torque deviation between the torque command value and the torque detection value; a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled; a speed converter for outputting an nth-order rotational frequency based on the nth-order rotational phase; an inverse model multiplication unit for multiplying, with the nth-order frequency component vector of the periodic disturbances, an inverse model to which a single frequency vector synchronized with the nth-order rotational frequency has been applied, and outputting an nth-order frequency component vector of an operation amount estimate value; an adder for adding the nth-order frequency component vector of the operation amount estimate value to a value obtained by passing an nth-order frequency component vector of the vibrational torque controller output through a low-pass filter, and outputting the nth-order frequency component vector of the vibrational torque controller output; and a compensation signal synthesis unit for outputting the vibrational torque command value based on the nth-order frequency component vector of the vibrational torque controller output and the nth-order rotational phase.

Additionally, one embodiment thereof is characterized in that the vibrational torque controller comprises a third subtraction unit for calculating a torque deviation between the torque command value and the torque detection value; a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled; a speed converter for outputting an nth-order rotational frequency based on the nth-order rotational phase; an inverse model multiplication unit for multiplying, with the nth-order frequency component vector of the periodic disturbances, an inverse model to which a single frequency vector synchronized with the nth-order rotational frequency has been applied, and determining an nth-order frequency component vector of an operation amount estimate value; an integrator for integrating the nth-order frequency component vector of the operation amount estimate value, and outputting the nth-order frequency component vector of the vibrational torque controller output; and a compensation signal synthesis unit for outputting the vibrational torque command value based on the nth-order frequency component vector of the vibrational torque controller output and the nth-order rotational phase.

Additionally, one embodiment thereof is characterized in that the vibrational torque controller comprises a vibration frequency component extractor for outputting an nth-order frequency component vector of the vibrational torque command value based on the torque command value and an nth-order rotational phase obtained by multiplying, with the rotational phase detection value, an order n of a torque ripple frequency component and a vibration frequency component to be controlled; a ripple suppression frequency component extractor for outputting an nth-order frequency component vector of periodic disturbances based on the torque detection value and the nth-order rotational phase; a speed converter for outputting an nth-order rotational frequency based on the nth-order rotational phase; a first inverse model multiplication unit for multiplying, with an nth-order frequency component vector of the vibrational torque command value, an inverse model to which a single frequency vector synchronized with the nth-order rotational frequency has been applied, and outputting an nth-order frequency component vector of a vibration-induced periodic disturbance command value; a second inverse model multiplication unit for multiplying, with an nth-order frequency component vector of the periodic disturbances, an inverse model to which a single frequency vector synchronized with the nth-order rotational frequency has been applied, and outputting an nth-order frequency component vector of an operation amount estimate value; a first multiplier for multiplying an observer gain with the nth-order frequency component vector of the vibration-induced periodic disturbance command value and outputting a result to a second multiplier; a second multiplier for multiplying an observer gain with the nth-order frequency component vector of the operation amount estimate value and outputting a result to a first subtractor; a first subtractor for subtracting, from the output of the second multiplier, a value obtained by passing an nth-order frequency component vector of the vibrational torque controller output through a low-pass filter, and outputting an nth-order frequency component vector of the periodic disturbance estimate value; a second subtractor for subtracting, from the output of the first multiplier, the nth-order frequency component vector of the periodic disturbance estimate value, and outputting an nth-order frequency component vector of the vibrational torque controller output; and a compensation signal synthesis unit for outputting the vibrational torque command value based on the nth-order frequency component vector of the vibrational torque controller output and the nth-order rotational phase.

Additionally, one embodiment thereof is characterized in that the vibrational torque controller comprises a third subtraction unit for calculating a torque deviation between the torque command value and the torque detection value; a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled; a speed converter for outputting an nth-order rotational frequency based on the nth-order rotational phase; an inverse model multiplication unit for multiplying, with the nth-order frequency component vector of the periodic disturbances, an inverse model to which a single frequency vector synchronized with the nth-order rotational frequency has been applied, and outputting an nth-order frequency component vector of an operation amount estimate value; a multiplier for multiplying an observer gain with the nth-order frequency component vector of the operation amount estimate value, and outputting a result to an adder; an adder for adding the output of the multiplier to a value obtained by passing the nth-order frequency component vector of the vibrational torque controller output through a low-pass filter, and outputting the nth-order frequency component vector of the vibrational torque controller output; and a compensation signal synthesis unit for outputting the vibrational torque command value based on the nth-order frequency component vector of the vibrational torque controller output and the nth-order rotational phase.

Additionally, one embodiment thereof is characterized in that the vibrational torque controller comprises a third subtraction unit for calculating a torque deviation between the torque command value and the torque detection value; a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled; a speed converter for outputting an nth-order rotational frequency based on the nth-order rotational phase; an inverse model multiplication unit for multiplying, with the nth-order frequency component vector of the periodic disturbances, an inverse model to which a single frequency vector synchronized with the nth-order rotational frequency has been applied, and determining an nth-order frequency component vector of an operation amount estimate value; a multiplier for multiplying an observer gain with the nth-order frequency component vector of the operation amount estimate value and outputting a result to an integrator; an integrator for integrating the output of the multiplier, and outputting an nth-order frequency component vector of the vibrational torque controller output; and a compensation signal synthesis unit for outputting the vibrational torque command value based on the nth-order frequency component vector of the vibrational torque controller output and the nth-order rotational phase.

Additionally, one embodiment thereof is characterized by having multiple vibrational torque controllers of different orders n; wherein a value obtained by summing the outputs of each of the vibrational torque controllers is used as the vibrational torque command value.

Additionally, one embodiment thereof is characterized in that, when the nth-order rotational phase is not inputted to the vibration frequency component extractor and a phase that is not synchronized with the nth-order rotational phase is inputted, unsynchronized vibration frequency components and nth-order rotational frequencies in parallel-stage control structures are separately monitored, and when these frequencies match, the nth-order frequency component vectors of the operation amount estimate values in the control structures in matching stages are set to zero.

Additionally, one embodiment thereof is characterized in that the order n of the vibrational torque controller includes decimal numbers.

Additionally, one embodiment thereof is characterized by comprising a drive motor for simulating engine explosion torque, connected to an input side of a test piece; an absorption motor for simulating a load from wheels and a road surface, connected to an output side of the test piece; a vibrational controller for outputting a first inverter torque command value based on a torque detection value and a rotational phase detection value of the drive motor; a speed controller for outputting a second inverter torque command value based on the motor rotation speed of the absorption motor; a drive motor inverter for driving the drive motor based on the first inverter torque command value; and an absorption motor inverter for driving the absorption motor based on the second inverter torque command value.

Thus, according to the present invention, it is possible to provide shaft torque vibrational control of a motor drive system wherein engine vibrational torque command values including distortion components are tracked while entirely removing the influence of resonance, non-periodic disturbances, and periodic disturbances.

BRIEF DESCRIPTION OF DRAWINGS

FIG. 1 is a basic configuration diagram of a drivetrain bench.

FIG. 2 is a diagram showing an example of the frequency transfer properties from the inverter torque command value $\tau_{inv}^*$ to the torque detection value $\tau_{det}$.

FIG. 3 is a diagram showing an example of the nonlinear spring properties of a test piece.

FIG. 4 is a diagram showing a three-inertia approximation model for a control target.

FIG. 5 is a basic control configuration diagram for Embodiment 1.

FIG. 6 is a diagram showing an example of the configuration of a generalized plant.

FIG. 7 is a property diagram for a μ-synthesis controller.

FIG. 8 is a configuration diagram for a μ-synthesis controller.

FIG. 9 is a frequency transfer property diagram for the case in which only high-frequency resonance suppression is implemented.

FIG. 10 is a design diagram for a low-frequency torque controller.

FIG. 11 is a frequency transfer property diagram for the case in which only low-frequency torque control is implemented.

FIG. 12 is a frequency transfer property diagram from a vibrational torque command value $\tau_{pd}^*$ to a torque detection value $\tau_{det}$ (low-frequency torque control ON, high-frequency resonance suppression controller ON).

FIG. 13 is a basic configuration diagram showing a vibrational torque controller.

FIG. 14 is a diagram showing an example of the effects of Embodiment 1.

FIG. 15 is a configuration diagram showing a vibrational torque controller according to Embodiment 2.

FIG. 16 is a configuration diagram showing a vibrational torque controller according to Embodiment 3.

FIG. 17 is a configuration diagram showing a vibrational torque controller according to Embodiment 4.

FIG. 18 is a diagram showing the robust stability of a generalized periodic disturbance observer against model error.

FIG. 19 is a diagram showing a torque waveform tracking control example for a one-cylinder-misfiring mode.

MODES FOR CARRYING OUT THE INVENTION

The present application proposes "arbitrary waveform tracking control of waveforms including distorted waveforms", so it is not limited to the basic configuration in FIG. 1. However, for the purposes of Embodiments 1 to 7, the solution to the problem and the effects of applying the invention will be described using an example of implementation in arbitrary waveform tracking control of shaft torque vibrations in a basic configuration similar to the drivetrain bench described in Non-Patent Document 1.

FIG. 1 is a basic configuration diagram showing a drivetrain bench. The test piece 1 is a torque converter, and a drive motor 2 on the input side thereof is used to simulate engine explosion torque. On the output side, an absorption motor 3 for simulating the load from wheels and a road surface is provided, and in the present configuration, rotation speed control is implemented. A shaft torque meter 4 is provided between the test piece 1 and the drive motor 2, and a detected torque detection value $\tau_{det}$ is controlled so as to track a torque command value $\tau^*$ simulating engine explosion torque.

A vibrational controller 5 implements vibrational control based on a torque command value $\tau^*$ including a vibration frequency component. In the present invention, unlike in Non-Patent Document 1, a rotational phase detection value θ from a rotational position sensor 6 is used to detect the phase of the vibration frequency component.

The speed controller 7 controls the motor rotation speed $\omega_m$ of the rotation position sensor 8 so as to track a speed command value $\omega_m^*$ in order to perform rotation speed control with the absorption motor 3. The speed controller 7 may be implemented by using general PID control or the like.

The drive motor 2 and the absorption motor 3 are driven, by means of a drive motor inverter INV1 and an absorption motor inverter INV2, based on inverter torque command values $\tau_{inv1}^*$ and $\tau_{inv2}^*$ outputted by the vibrational controller 5, and the speed controller 7.

The drive motor inverter INV1 and the absorption motor inverter INV2 are power converters for converting DC power to AC power. The AC output terminals of the drive motor inverter INV1 and the absorption motor inverter INV2 are connected to terminals of the drive motor 2 and the absorption motor 3. The drive motor inverter INV1 and the absorption motor inverter INV2 have the functions of controlling the shaft torques (torque detection values) $\tau_{det}$ of the motors to the the inverter torque command values $\tau_{inv1}^*$ and $\tau_{inv2}^*$ by controlling the AC output currents (i.e., the motor currents) of the drive motor inverter INV1 and the absorption motor inverter INV2.

FIG. 2 is an example of the frequency transfer properties from the inverter torque command value $\tau_{inv1}^*$ inputted in the drive motor inverter INV1 to the torque detection value $\tau_{det}$. In the present invention, the configuration in FIG. 1 is approximated by an equivalent three-inertia system, and the resonance point that varies in the low-frequency region is generated as a result of the nonlinear spring behavior of the torque converter which is the test piece 1.

For reference, an example of nonlinear spring properties is shown in FIG. 3. The resonance point in the high-frequency region is generated as a result of shaft torsional rigidity in the mechanical equipment such as the drive motor 2, the shaft torque meter, and couplings.

Thus, the drivetrain bench described in the present invention forms a three-inertia system having nonlinear resonance properties in the low-frequency region and having high resonance properties in the high-frequency region. This means that, when a simple vibrational torque is applied to the torque command value $\tau^*$, resonance will occur and a desired vibration waveform will not be obtained.

In the four-cycle engines that are widely used in automobiles, the explosion torque thereof includes large torque vibrations at frequency components equal to the number of cylinders×0.5×rotation speed. For example, if three-cylinder to eight-cylinder engines are to be simulated at engine rotation speeds of 600 min$^{-1}$ to 6000 min$^{-1}$, vibrational control must be implemented in the band from 15 to 400 Hz.

Additionally, if distortion components are to be considered, then the control must extend to bands even higher than 400 Hz, so it is necessary to track vibrational frequency components up to the mechanical structural limit as much as possible.

FIG. 4 shows a block diagram of a control target when the present configuration is approximated as a three-inertia system. The reference signs in FIG. 4 are defined as follows: J1, moment of inertia of drive motor; J2, moment of inertia of test piece and coupling; J3, moment of inertia of absorption motor; K12, shaft torsional rigidity of coupling and shaft torque meter; K23 and ΔK23, shaft torsional rigidity of test piece (having nonlinear properties, FIG. 3); C23, loss in test piece; $G_{inv}(s)$, drive-side inverter response transfer function; $G_{tm}(s)$, shaft torque detection response transfer function; $G_\theta(s)$, rotational phase detection response transfer function; s, Laplace operator.

As mentioned above, the torque converter which is the test piece 1 has nonlinear spring properties, and is thus expressed by using K23 and ΔK23. Additionally, the inverter, torque meter detection, and phase detection involve response delays and lost time, so an approximate response transfer function is inserted.

While the frequency transfer properties, from the inverter torque command value $\tau_{inv}^*$ to the torque detection value $\tau_{det}$, of the approximation model shown in FIG. 4 are as shown in FIG. 2, it is desirable to design a controller in which the gain is always 0 dB, i.e., the transfer properties from the inverter torque command value $\tau^*$ to the torque detection value $\tau_{det}$ are 1, in the frequency band in which the vibrations are applied. In order to do so, it is necessary to implement resonance suppression control in the low-frequency region and the high-frequency region. Additionally, amplification is necessary in bands in which the amplitude properties are lower than 0 dB.

Embodiment 1

The present Embodiment 1 is based on a method wherein, as in Non-Patent Document 1, the frequencies are divided between low-frequency and high-frequency resonance frequency bands, and high-frequency resonance suppression control and low-frequency steady-state torque control are implemented. This is combined with a generalized periodic disturbance observer as a method for implementing "vibration waveform tracking control of waveforms including distortion components", which cannot be implemented with the method in Non-Patent Document 1.

FIG. 5 is a control configuration diagram that is based on the present Embodiment 1. The reference signs in FIG. 5 are defined as follows:

$\tau^*$, torque command value; $\tau_{dc}^*$, low-frequency torque controller output; $\tau_{pd}^*$, vibrational torque command value; $\tau_r^*$, corrected torque command value; $\tau_{inv}^*$, inverter torque command value; $\tau_{det}$, torque detection value; θ, rotational phase detection value.

As shown in FIG. 5, in the motor drive system for controlling the motor shaft torque in the present Embodiment 1 by using an inverter, a low-frequency torque controller 9 outputs a low-frequency torque controller output $\tau_{dc}^*$ based on a torque command value $\tau^*$ and a torque detection value $\tau_{det}$. Additionally, a vibrational torque controller 11 outputs a vibrational torque command value $\tau_{pd}^*$ based on the torque command value $\tau^*$, the torque detection value $\tau_{det}$, and a rotational phase detection value θ. A high-frequency resonance suppression controller 10 outputs an inverter torque command value $\tau_{inv}^*$ based on the torque detection value $\tau_{det}$ and a corrected torque command value $\tau_r^*$ obtained by adding the low-frequency torque controller output $\tau_{dc}^*$ to the vibrational torque command value $\tau_{pd}^*$.

The "control target" in the present Embodiment 1 corresponds to the three-inertia approximation model shown in FIG. 4.

As shown in FIG. 5, the functions of the present Embodiment 1 include the three functions of a "low-frequency torque controller 9", a "high-frequency resonance suppression controller 10", and a "vibrational torque controller 11" formed by a generalized periodic disturbance observer. Herebelow, each function will be described in order.

First Function, "High-Frequency Resonance Suppression Controller 10"

In the three-inertia approximation model shown in FIG. 4, there is a low-frequency resonance point and a high-frequency resonance point. When a comprehensive controller that implements resonance suppression across all frequency bands is designed, the design tends to be conservative, and when taking nonlinearities in the low-frequency region into consideration, it becomes difficult to design systems that have robust control performance.

Therefore, in such a system, it is effective to separate low-frequency and high-frequency control systems. In the present Embodiment 1, high-frequency resonance suppression control is implemented by a μ-synthesis controller which is a robust control method, and this is combined with a method in which the low-frequency nonlinear resonance properties due to the test piece 1 are not subjected to active resonance suppression control, and steady-state torque tracking control is implemented.

First, the high-frequency resonance suppression controller 10, which is the first function, will be explained. The resonance frequency in the high-frequency region, based on the properties in FIG. 2, is equivalent to the resonance frequency in the two-inertia resonance system with the moment of inertia J1 of the drive motor and the moment of inertia J2 of the test piece and the coupling in FIG. 4. Therefore, the high-frequency resonance frequency is roughly the same as the resonance frequency $f_{rH}$ calculated by Equation (1).

[Expression 1]

$$f_{rH} = \frac{1}{2\pi}\sqrt{K12\left(\frac{1}{J1} + \frac{1}{J2}\right)} \quad (1)$$

Therefore, taking into account this approximated two-inertia system in order to suppress the high-frequency resonance, a generalized plant used for designing a high-frequency resonance suppression controller is formed as shown in FIG. 6. In the present Embodiment 1, an example using μ-synthesis, which is a robust control method, will be described, but it is possible to use other general resonance suppression control methods, such as $H_\infty$ control. The reference signs in FIG. 6 are defined as follows:
Δτ, torque deviation; $G_{tm}(s)$, detection response transfer function of torque meter or the like; $G_{inv}(s)$, inverter response transfer function; d1, disturbance (including periodic disturbances); d2 and r, μ-synthesis controller command value inputs; d3, torque detection noise; z, steady-state torque error evaluation output; w, disturbance input due to steady-state torque error; u, μ-synthesis controller output; y, μ-synthesis controller detector input; e1, torque detection value evaluation output; e2, inverter torque command evaluation output; e3, μ-synthesis controller gain evaluation output; $W_n(s)$, weighting function for disturbance d1; $W_u(s)$, weighting function for μ-synthesis controller output u; $W_e(s)$, weighting function for μ-synthesis controller gain.

When designing a controller using μ-synthesis, perturbations in the mechanical parameters or the like could be separately considered. However, in practice, the explicit identification of a physical model (spring/mass elements) is often omitted in favor of simplified identification based on the frequency transfer properties from the torque inputs and outputs.

Therefore, in this case, a method in which the torque error Δτ inputted from the inverter is approximated as the perturbation term is used to ensure robust control performance.

In order to implement steady-state torque tracking control in the low-frequency region using the low-frequency torque controller 9 mentioned below, the high-frequency resonance suppression controller 10 in the high-frequency region is designed so as to reduce the controller gain in the low-frequency region.

In other words, in the gain from the command value input r of the μ-synthesis controller to the μ-synthesis controller output u, a μ-synthesis controller gain evaluation output e3 is set by means of a weighting function $W_e(s)$ on the μ-synthesis controller gain. In order to prevent control interference with the low-frequency torque controller 9, the weighting function $W_e(s)$ on the μ-synthesis controller gain is weighted in the low-frequency region.

Additionally, the weighting function $W_u(s)$ for the μ-synthesis controller output u (weighting function for the inverter torque command u) is weighted in the high-frequency region so as to reduce the high-frequency gain of the inverter torque command. The weighting function $W_n(s)$ for the disturbance d1 is weighted in the vicinity of the resonance frequency in order to improve the periodic disturbance and non-periodic disturbance suppression performance.

An example of the properties of a μ-synthesis controller obtained by performing D-K iteration in a generalized plant configured as in FIG. 6 is shown in FIG. 7. As can be understood by seeing the gain properties in the transfer properties $C_{tm}(s)$, the low-frequency gain is lowered so as not to respond to the torque detection value $\tau_{det}$ on the low-frequency (low frequency region) side due to the effects of the weighting function $W_e(s)$ on the μ-synthesis controller gain. As a result thereof, it is possible to prevent control interference with the low-frequency torque controller 9 described below.

Additionally, as can be understood by seeing the gain properties in the transfer properties $C_{ref}(s)$, the controller is designed to reduce the gain in the vicinity of the resonance frequency, so resonance due to the frequency component of the vibrational torque can be suppressed.

In FIG. 7, the upper part shows a gain diagram and the lower part shows a phase diagram. The left side shows the transfer properties $C_{ref}(s)$ of the μ-synthesis controller from the command value input r to the μ-synthesis controller output u, and the right side shows the transfer properties $C_{tm}(s)$ of the μ-synthesis controller from the detection value input y to the μ-synthesis controller output u.

The μ-synthesis controller having the transfer properties $C_{ref}(s)$ and the transfer properties $C_{tm}(s)$ designed above is installed, with the configuration shown in FIG. 8, in a portion of the high-frequency resonance suppression controller 10 in FIG. 5.

An output obtained by subjecting the corrected torque command value $\tau_r^*$ to the transfer properties $C_{ref}(s)$ is added to an output obtained by subjecting the torque detection value $\tau_{det}$ to the transfer properties $C_{tm}(s)$ so as to generate an inverter torque command value $\tau_{inv}^*$.

FIG. 9 shows the frequency transfer properties from the torque command value τ* to the torque detection value $\tau_{det}$ for the case in which only high-frequency resonance suppression control is implemented. It can be seen that the high-frequency (high-frequency region) gain is suppressed to 0 dB or less.

Second Function, "Low-Frequency Torque Controller 9"

Next, the low-frequency torque controller 9 in FIG. 5 will be described as the second function. The resonance frequency in the low-frequency region varies depending on the nonlinear spring properties of the test piece 1. A method of implementing robust resonance suppression control taking these nonlinear properties into consideration could be contemplated, but the design would depend on the nonlinear properties of the test piece. In actual practice, tests are often run by exchanging the test piece 1, and if the controller were to be designed so as to depend on the properties of the test piece, then there would be a problem in that the controller or the parameters thereof would need to be readjusted each time.

Therefore, the present Embodiment 1 aims for a design that does not depend on the properties of the test piece 1 even if it is changed, so that the low-frequency torque controller 9 does not actively perform suppression control, and merely has the purpose of providing stable tracking control of the steady-state torque.

In the three-inertia approximation model shown in FIG. 4, by focusing on the resonance frequency in the low-frequency region, it is possible to approximate the model as a two-inertia resonance system with the parameters J1+J2, K23, and J3, in view of the properties in FIG. 2. In other words, the resonance frequency $f_{rL}$ in the low-frequency region is roughly given by Equation (2). However, the influence of the shaft torsional loss C23 is omitted.

[Expression 2]

$$f_{rL} = \frac{1}{2\pi}\sqrt{K23\left(\frac{1}{J1+J2} + \frac{1}{J3}\right)} \quad (2)$$

When a low-frequency control target is approximated as a two-inertia system, a low-frequency torque controller 9 can be designed by using an approximation as shown in FIG. 10. As one example, the controller employs a format wherein proportion-derivative-forward I-PD control based on PID control is used, and a first-order low-pass filter $G_{F1}(s)$ is applied to the proportion term and the derivative term. Of course, the controller is not limited to the configuration in FIG. 10 and may be realized by using other types of PID control.

Additionally, in order to avoid control spillover due to the high-frequency resonance point, a second-order low-pass filter $G_{F2}(s)$ is used on the output of the I-PD controller. The cutoff frequency of this second-order low-pass filter $G_{F2}(s)$ is set to be a cutoff frequency that does not largely influence the low-frequency torque control properties and that can cut off the high-frequency resonance properties. As a result thereof, the control is separated from that of the high-frequency resonance suppression control system which is the above-described first function, thereby preventing control interference.

The closed-loop transfer properties from the torque command value $\tau^*$ to the torque detection value $\tau_{det}$ in the configuration approximated in FIG. 10 are fourth-order properties, so the parameters $K_p$, $K_i$ and $K_d$ in the I-PD control may be calculated by using a model matching method for matching the poles in a fourth-order standard model. As an example, when the poles are arranged with the properties of a fourth-order Butterworth filter, the parameters are calculated as shown in Equation (3). The method for determining the PID parameters is not limited thereto, and they may be adjusted using various other methods.

[Expression 3]

$$\begin{cases} K_p = \frac{J1+J2+J3}{J3} \cdot \left(\frac{k^2(a_1 a_3 - 1)}{a_3^2} - 1\right) \\ K_i = \frac{J1+J2+J3}{J3} \cdot \frac{\omega_0 k^2}{a_3} \\ K_d = \frac{J1+J2+J3}{J3} \cdot \frac{a_2 k^2 - 1}{a_3 \omega_0} \\ \omega_{f1} = a_3 \omega_0 \end{cases} \quad (3)$$

a1, a2, and a3 are the coefficients of the respective orders in the equation for the properties determined by the pole arrangement in the standard model. In the case of a Butterworth standard, a1=2.6131, a2=3.4142 and a3=2.6131.

Additionally, k is a parameter for determining the control response for torque tracking control, and is designated by a coefficient to the low-frequency resonance frequency $f_{rL}$. In this case, the response frequency $\omega c$ is determined by $\omega c = k \times (2 \times \pi \times f_{rL})$. $\omega f1$ is the cutoff frequency of the low-pass filter associated with the proportion term and the derivative term, and can be determined as in Equation (3). The frequency transfer properties from the torque command value $\tau^*$ to the torque detection value $\tau_{det}$ when implementing low-frequency torque control configured as indicated above are shown in FIG. 11.

As can be understood by seeing FIG. 11, the low-frequency torque controller 9 cuts off the low-frequency resonance properties, but the desired command value amplitude is obtained only in a frequency region even lower than the low-range resonance frequency.

In other words, although it is possible to implement stable tracking control in the region lower than the low-range resonance frequency or the steady-state torque, the controller will not be able to respond even when a high-frequency vibration signal is applied to the torque command value. Therefore, for vibrational control, it is necessary to separately use a vibrational torque controller 11 that is not connected with the low-frequency torque controller 9, as shown in FIG. 5, and to superimpose the result at the output unit of the low-frequency torque controller.

Third Function, "Vibrational Torque Controller 11"

As mentioned above, the low-frequency torque controller 9 only performs tracking control in the low-frequency region including the steady-state torque, and the high-frequency resonance suppression controller 10 contributes only to attenuate the resonance properties in the high-frequency region. Therefore, in order to implement vibrational control across the desired wide range of frequency bands, the vibrational torque controller 11 in FIG. 5 is necessary.

The vibrational torque controller 11 receives, as inputs, a torque command value $\tau^*$ and a torque detection value $\tau_{det}$ including vibration frequency components, and a reference phase θ (the rotational phase detection value of the motor) for generating vibration frequency components. A vibrational torque command value $\tau_{pd}^*$ that is outputted from the vibrational torque controller 11 is superimposed on the low-frequency torque controller output $\tau_{dc}^*$, forming a corrected torque command value $\tau_\tau^*$.

At this time, the transfer properties of the vibrational torque controller 11 from the vibrational torque command value $\tau_{pd}^*$ to the torque detection value $\tau_{det}$ are the closed-loop transfer properties of the control target, including the low-frequency torque controller 9 and the high-frequency resonance suppression controller 10, and are as shown in FIG. 12. In the vibrational frequency band, it is desirable for the amplitude (gain) properties in FIG. 12 to be constantly 0 dB, and for the phase properties to be constantly 0 degrees. However, it is difficult to obtain a controller that actually has such frequency properties.

Therefore, in the vibrational torque controller 11, it is necessary to adjust the gain and the phase of each frequency component of the vibrational torque by taking into consideration the transfer properties in FIG. 12. Although it is possible to generate a command value by using inverse properties of FIG. 12 in the frequency band (15 to 400 Hz) in which the vibrations are applied, the test piece 1 has nonlinear spring properties, which change according to the operating state. Therefore, with a method for generating a command value simply by using inverse properties, it is difficult to obtain a vibrational torque waveform with the desired amplitude and phase.

Thus, a method for automatically adjusting the vibrational torque waveform by using a generalized periodic disturbance observer is proposed. FIG. 13 shows a basic configuration diagram for the vibrational torque controller 11 in the present Embodiment 1. The reference signs in FIG. 13 are defined as follows:

$\tau^*$, torque command value (including the vibration frequency components); $\tau_{det}$, torque detection value; θ, rotational phase detection value; n, order (designating the order of the torque ripple frequency component and the vibration frequency component to be controlled); $\omega_m$, motor rotation speed; $\tau_{rpd*}$, vibrational torque command value; $T_n^*$, nth-order frequency component vector of vibrational torque command value; $T_n$, nth-order frequency component vector of periodic disturbances (torque ripples); $U_n\hat{}$, nth-order frequency component vector of operation amount estimate value (estimate value including periodic disturbances); $D_n^*$, nth-order frequency component vector of vibration-induced periodic disturbance command value; $D_n\hat{}$, nth-order frequency component vector of periodic disturbance estimate value; $T_{pdn}^*$, nth-order frequency component vector of vibrational torque controller output; $G_F(s)$, low-pass filter for extracting frequency components.

A generalized periodic disturbance observer is a control system for suppressing periodic disturbances by focusing on a specific frequency component, which is applied, in the present Embodiment 1, as a method for generating desired periodic vibrations. In this method, the control system contributes only specific frequency components. First, the frequency component at which vibrations are to be applied is extracted by the vibration frequency component extractor 12, and the frequency component of the periodic disturbances (torque ripples) to be suppressed is extracted by the ripple suppression frequency component extractor 13.

That is, in the vibration frequency component extractor 12, the nth-order frequency component vector $T_n^*$ of the vibrational torque command value is outputted based on the torque command value $\tau^*$ and the nth-order rotational phase $n\theta$ obtained by multiplying the rotational phase detection value $\theta$ with the order n. Additionally, in the ripple suppression frequency component extractor 13, the nth-order frequency component vector $T_n$ of the periodic disturbances is outputted based on the torque detection value $\tau_{det}$ and the nth-order rotational phase $n\theta$.

These are nth-order frequency components that are generated in synchronization with the motor rotation speed, and are thus extracted as described below, using the nth-order rotational phase $n\theta$ which is n-times the rotational phase detection value $\theta$. In this case, coordinates synchronized with the frequency component of the nth-order rotational phase $n\theta$ are defined as a $d_n q_n$ rotating coordinate system, wherein $d_n$ represents the real part of a complex vector and $q_n$ represents the axis for the imaginary part.

[Expression 4]

$$T_n^* = \begin{bmatrix} T_{dn}^* \\ T_{qn}^* \end{bmatrix} = 2G_F(s) \cdot \mathcal{L}\left[\begin{bmatrix} \cos n\theta \\ \sin n\theta \end{bmatrix} \cdot \tau^*\right] \quad (4)$$

$$T_n = \begin{bmatrix} T_{dn} \\ T_{qn} \end{bmatrix} = 2G_F(s) \cdot \mathcal{L}\left[\begin{bmatrix} \cos n\theta \\ \sin n\theta \end{bmatrix} \cdot \tau_{det}\right] \quad (5)$$

where $T_n^* = T_{dn}^* + jT_{qn}^*$, $T_n = T_{dn} + jT_{qn}$, L indicates a Laplace transform, and s indicates a Laplace operator.

Equation (4) is for extracting the vibration frequency component included in the torque command value $\tau^*$ and Equation (5) is for extracting the periodic disturbances included in the torque detection value $\tau_{det}$, i.e., the frequency component of the torque ripple. Although a strict Fourier transform may be used, in the present Embodiment 1, the frequency components are extracted by a low-pass filter $G_F(s)$ in consideration of the ease of installation in the computation unit.

In a speed converter 14, the nth-order rotational phase $n\theta$ is differentiated to compute the nth-order rotational frequency $n \cdot \omega_m$.

Next, the inverse model $Q_n$ will be described. In the $d_n q_n$ rotating coordinate system, the control system only affects the specific frequency component, so the control target model in the vibrational torque controller 11 can be represented by a one-dimensional complex vector. In this case, the control target model synchronized with the frequency component of the nth-order rotational phase $n\theta$ is defined as $P_n$, where $P_n = P_{dn} + jP_{qn}$.

As mentioned above, the control target system for the vibrational torque controller 11 has the frequency transfer properties from the vibrational torque command value $\tau_{pd}^*$ to the torque detection value $\tau_{det}$ shown in FIG. 12. However, the amplitude and phase properties synchronized with the frequency component of the nth-order rotational phase $n\theta$ in this graph, extracted as a complex vector, form the control target model $P_n$. Therefore, this means that the control target model $P_n$ changes according to the motor rotation speed $\omega_m$ and the order n.

For example, when the amplitude and phase properties from 1 to 1000 Hz in FIG. 12 are divided for every Hz, 1000 complex vectors are formed, and one vector synchronized with the frequency component of the nth-order rotational phase $n\theta$, which changes according to the motor rotation speed, may be selected therefrom, and applied to the control target model $P_n$. In other words, the control target model $P_n$ corresponds to a type of gain scheduling function that is dependent on the motor rotation speed.

The control target model $P_n$ in the $d_n q_n$ rotating coordinate system defined in this way changes in accordance with the frequency component that is to be suppressed or applied as a vibration, and the inverse model $Q_n$ thereof must be changed in accordance with the motor rotation speed. Therefore, as shown in FIG. 13, an inverse model synchronized with the frequency component of the nth-order rotational phase $n\theta$ is selected on the basis of the nth-order rotational frequency $n \cdot \omega_m$ calculated by the speed detector. The inverse model $Q_n$ is expressed by the following Equation (6):

[Expression 5]

$$Q_n = Q_{dn} + jQ_{qn} = \frac{1}{P_{dn} + jP_{qn}} \quad (6)$$

The purpose of the present control is to implement desired vibrational torque and torque ripple suppression using a shaft torque meter, which is the output of the control target, and the input (operation amount) to the control target must be determined by considering the control target transfer properties (control target model) $P_n$. Therefore, as shown in FIG. 13, the properties of the inverse model $Q_n$ are used to calculate the nth-order frequency component vector $D_n^*$ of the vibration-induced periodic disturbances at the input of the control target model $P_n$ from the nth-order frequency component vector $T_n^*$ of the vibrational torque command value. The equation for computing the nth-order frequency component vector $D_n^*$ of the vibration-induced periodic disturbances is Equation (6-2).

[Expression 6]

$$D_n^* = Q_n \cdot T_n^* \quad (6\text{-}2)$$

Similarly, the nth-order frequency component spectrum $T_n$ of the periodic disturbances is used to estimate the nth-order frequency component vector (estimate value including periodic disturbances) $U_n\hat{}$ of the operation amount estimate value. The equation for computing the nth-order frequency component vector $U_n^{\wedge}$ of the operation amount estimate value is Equation (6-3).

[Expression 7]

$$U_n^{\wedge}=Q_n \cdot T_n \quad (6\text{-}3)$$

In this case, the nth-order frequency component vector $U_n^{\wedge}$ of the operation amount estimate value is estimated so as to include the component of the torque ripples, which are periodic disturbances. Therefore, the nth-order frequency component vector $T_{pdn}^*$ of the vibrational torque controller output, which is the operation amount inputted to the control target model $P_n$, is subtracted therefrom to estimate the nth-order frequency component vector $D_n^{\wedge}$ of the periodic disturbance estimate value. These principles follow those of disturbance observer methods that have conventionally been widely used.

When the nth-order frequency component vector $T_{pdn}^*$ of the vibrational torque controller output is subtracted from the nth-order frequency component vector $U_n^{\wedge}$ of the operation amount estimate value, the nth-order frequency component vector $T_{pdn}^*$ of the vibrational torque controller output that has passed through the low-pass filter $G_F(s)$ is subtracted for the purpose of synchronization with the response delays in the low-pass filters $G_F(s)$ used in the vibrational frequency component extractor 12 and the ripple suppression frequency component extractor 13.

Furthermore, the nth-order frequency component vector $T_{pdn}^*$ of the vibrational torque controller output is calculated by further subtracting the nth-order frequency component vector $D_n^{\wedge}$ of the periodic disturbance estimate value from the nth-order frequency component vector $D_n^*$ of the vibration-induced periodic disturbance command value. Due to the above, it is possible to remove the vibration components due to periodic disturbances (torque ripples) while leaving the frequency components included in the vibrational torque command, allowing only the desired vibrational components to be generated in the shaft torque detection unit.

In the compensation signal synthesis unit 19, the nth-order frequency component vector $T_{pdn}^*$ of the vibrational torque controller output is restored from the $d_n q_n$ rotating coordinate system to a time waveform on the basis of Equation (7). It is also possible to configure the invention so that there are multiple orders of n arranged in parallel, and these frequency components of each order can be summed to synthesize a vibrational torque command value $\tau_{pd}^*$.

[Expression 8]

$$\tau_{pd}^* = T_{PDdn}^* \cos nq + T_{PDqn}^* \sin nq \quad (7)$$

where $T_{PDn}^* = T_{PDdn}^* \mathrm{j} T_{PDqn}^*$

The three basic functions included in the configuration of FIG. 5 have been described above. By simultaneously operating these three functions, the following effects are obtained.

The functions of "low-frequency torque tracking control", "high-frequency resonance suppression control" and "shaft torque vibrational control" operate simultaneously without interference, and it is possible to simulate engine explosion torque, which has a distorted waveform including multiple frequency components.

It is possible to suppress only periodic disturbances due to torque ripples, which cause problems, while leaving the vibration components of vibrational torque commands.

By applying high-frequency resonance suppression control, sudden changes in amplitude and phase due to resonance properties can be reduced, thereby also reducing the inverse model properties of the generalized periodic disturbance observer in the vibrational torque controller 11. This means that the property changes are reduced when extracting the inverse model during variable-speed operation, which greatly contributes to improvements in robust stability, particularly when the resonance frequencies intersect or when there is modeling error.

High-frequency resonance suppression control also has the effect of suppressing non-periodic disturbances so that, in addition to periodic disturbance suppression effects using the generalized periodic disturbance observer, non-periodic disturbances can be simultaneously suppressed.

By designing the system so that low-frequency torque tracking control, high-frequency resonance suppression control, and periodic component control systems are separated, it is possible to simultaneously implement comprehensive "resonance suppression", "non-periodic disturbance suppression", "periodic disturbance suppression", and "vibrational control", which it is difficult to realize with the systems separately. Additionally, there is no control interference therebetween.

FIG. 14 shows an example of the effects in the present Embodiment 1. The upper part of FIG. 14 is the shaft torque waveform in a conventional vibrational control system. This is the case in which "low-frequency torque control" and "high-frequency resonance suppression control" are applied as in Non-Patent Document 1, but the "vibrational torque controller 11" proposed in the present Embodiment 1 is not made to function, and the vibrational torque command value including the distortion components is applied directly to the vibrational torque command value $\tau_{pd}^*$. The vibrational torque command value and the shaft torque detection value do not match, and the desired waveform is not obtained in the shaft torque.

In Non-Patent Document 1, a method for automatically adjusting the vibration amplitude is proposed, but the method tracks only the magnitude of the vibration amplitude, and is premised on vibrational control by means of a sine waveform having a single frequency component. Therefore, even if the vibration amplitude control in the Non-Patent Document 1 is implemented, it is not possible to perform tracking control of the shape of the distorted waveform, and the phase is also unmatched. Additionally, since the effects of periodic disturbances such as torque ripples are not considered, unwanted distortion components remain as indicated by the waveform in the upper part of FIG. 14.

The lower part of FIG. 14 shows a torque waveform for the case in which engine vibrational torque waveform tracking control is implemented by the vibrational torque controller 11 in the present Embodiment 1. The waveform is matched to the vibrational torque command value including distorted waveforms, and is able to track both the amplitude and phase. Additionally, simultaneously with the vibrational control, torque ripples, which are periodic disturbances, are estimated and removed by a generalized periodic disturbance observer, so unwanted distortions due to periodic disturbances such as those mentioned above are also removed.

Even if there is a change in the operating state such as the motor rotation speed (corresponding to the engine rotation speed) and the magnitude of the torque, the vibrational torque controller can still function and the shape can be automatically tracked. In this case, the transient response is the same as the quick response of the generalized periodic disturbance observer, and is determined by the low-pass filter $G_F(s)$ used in periodic frequency extraction. As a numerical example, it is possible to track even transient changes at approximately 0.3 seconds.

When Embodiment 1 is applied to the motor drive system in FIG. 1, the vibrational controller 5 in FIG. 1 is formed from the low-frequency torque controller 9, the high-frequency resonance suppression controller 10, and the vibrational torque controller 11 in FIG. 5.

Embodiment 2

In the configuration of Embodiment 1 shown in FIG. 13, the frequency component included in the torque command value $\tau^*$ and the periodic disturbance frequency component included in the torque detection value $\tau_{det}$ were separately extracted. However, in the present Embodiment 2, these are not distinguished, and a method for simultaneously controlling the vibrational frequency component and the periodic disturbance component using a simpler configuration is provided.

FIG. 15 is a configuration diagram showing a vibrational torque controller 11 according to the present Embodiment 2. The other control functions are similar to those in Embodiment 1.

Taking the torque deviation $\Delta\tau$ between the torque command value $\tau^*$ including the vibrational frequency component and the torque detection value $\tau_{det}$, if the frequency components contained in the deviation become zero, then this means that the vibrational torque command value and the shaft torque detection value are matched with regard to the periodic vibrational component.

Therefore, in the present Embodiment 2, the generalized periodic disturbance observer is operated so as to eliminate the deviation by extracting the frequency component of the torque deviation $\Delta\tau$ in an integrated manner without distinguishing between the vibrational frequency component and the periodic disturbance frequency component due to torque ripples. In FIG. 13 relating to Embodiment 1, the nth-order frequency component vector $D_n^*$ of the vibration-induced periodic disturbance command value was used as the command-side frequency component vector. However, since the purpose in the present Embodiment 2 is to eliminate the deviation, it is sufficient to set the nth-order frequency component vector $D_n^*$ of the vibration-induced periodic disturbance command value to zero.

In FIG. 13, the control block diagram, for the case in which the nth-order frequency component vector $D_n^*$ of the vibration-induced periodic disturbance command value is set to zero, can be converted to the equivalent as in FIG. 15, and the same control effects as in Embodiment 1 can be obtained with a relatively simple configuration. Compared to FIG. 13 in Embodiment 1, one of the vibrational frequency component extractors 12 and an inverse model multiplier 15 for multiplying the inverse model can be omitted, thereby reducing the computation load of a computer such as a microprocessor.

Additionally, by using the torque deviation $\Delta T$, the DC component is removed, in the steady state, by means of the tracking operation of the low-frequency torque controller 9. The secondary effects due thereto are explained below.

If a DC component Tdc is included in the frequency component extractor 22, the frequency components $T_{dn}$ and $T_{qn}$ can be expanded as in Equation (8) below.

[Expression 9]

$$\begin{cases} T_{dn} = 2G_F(s) \cdot \mathcal{L}[(T_{dc} + T_{dn}\cos n\theta + T_{qn}\sin n\theta) \cdot \cos n\theta] \\ \quad = G_F(s) \cdot \mathcal{L}[(T_{dn} + T_{dn}\cos 2n\theta + T_{qn}\sin 2n\theta + 2T_{dc}\cos n\theta)] \\ T_{qn} = 2G_F(s) \cdot \mathcal{L}[(T_{dn}\cos n\theta + T_{qn}\sin n\theta) \cdot \sin n\theta] \\ \quad = G_F(s) \cdot \mathcal{L}[(T_{qn} - T_{qn}\cos 2n\theta + T_{dn}\sin 2n\theta + 2T_{dc}\sin n\theta)] \end{cases} \quad (8)$$

By removing $T_{dn} \cos 2n\theta + T_{qn} \sin 2n\theta + 2T_{dc} \cos n\theta$ and $T_{qn} \cos 2n\theta + T_{dn} \sin 2n\theta + 2T_{dc} \sin n\theta$ in Equation (8) with a low-pass filter $G_F(s)$, $\tau_{dn}$ and $T_{qn}$ can be obtained. A $2n\theta$ component and an $n\theta$ component are included, and if these frequency components are sufficiently higher than the cutoff frequency of the low-pass filter $G_F(s)$, then these frequency components can be cleanly extracted.

If the motor rotation speed is low and the frequency of the nth-order rotational phase $n\theta$ is also low, then the cutoff frequency of the low-pass filter $G_F(s)$ will be approached, meaning that the influence of the frequency components of $T_{dn} \cos 2n\theta + T_{qn} \sin 2n\theta + 2T_{dc} \cos n\theta$ and $T_{qn} \cos 2n\theta + T_{dn} \sin 2n\theta + 2T_{dc} \sin n\theta$ will appear in $T_{dn}$ and $T_{qn}$. These become disturbances in the $d_n q_n$ rotating coordinate system of the generalized periodic disturbance observer, and cause destabilization of the control system.

Therefore, the cutoff frequency of the low-pass filter $G_F(s)$ must be set to a sufficiently low value. However, as mentioned above, the transient response of the generalized periodic disturbance observer is determined by the response of the low-pass filter $G_F(s)$. Thus, if the cutoff frequency is made too low, then the quick response of the torque waveform tracking will become worse.

In order to mitigate this tradeoff, it is desirable to pre-remove the $n\theta$ component in $T_{dn} \cos 2n\theta + T_{qn} \sin 2n\theta + 2T_{dc} \cos n\theta$ and $T_{qn} \cos 2n\theta + T_{dn} \sin 2n\theta + 2T_{dc} \sin n\theta$ in Equation (8). Focusing on the coefficients of the $\sin n\theta$ and $\cos n\theta$, it can be seen that both are $2 \cdot T_{dc}$. In other words, if the DC component $T_{dc}$ included in the input signal is zero, then there will be no $n\theta$ component. As a result thereof, only the $2n\theta$ component will remain in $T_{dn} \cos 2n\theta + T_{qn} \sin 2n\theta + 2T_{dc} \cos n\theta$ and $T_{qn} \cos 2n\theta + T_{dn} \sin 2n\theta + 2T_{dc} \sin n\theta$ in Equation (8).

The $2n\theta$ component can be more easily cut off than the $n\theta$ component, thus mitigating the above-mentioned tradeoff problem, and making it easier to design a low-pass filter $G_F(s)$.

In the present Embodiment 2, the nth-order frequency component vector $T_n$ of periodic disturbances is determined by inputting, to the frequency component extractor 22, the torque deviation $\Delta\tau$ instead of the torque detection value $\tau_{det}$ in Equation (5). In the present Embodiment 2, the DC component of the torque deviation $\Delta\tau$ is eliminated by the low-frequency torque controller 9, and the input signal to the frequency component extractor is the torque deviation $\Delta\tau$, so the aforementioned secondary effects are also obtained.

Embodiment 3

In the present Embodiment 3, the low-pass filter in the frequency component extractor 22 is limited to being a first-order filter, and the configuration of Embodiment 2 is further simplified. FIG. 16 is a configuration diagram showing the present Embodiment 3.

If the low-pass filter $G_F(s)$ used in the frequency component extractor 22 of the generalized periodic disturbance observer is limited to being the first-order low-pass filter indicated by Equation (9), FIG. 15 showing Embodiment 2 can be converted to the equivalent control block diagram in FIG. 16.

[Expression 10]

$$G_F(s) = \frac{\omega_f}{s + \omega_f} \quad (9)$$

where $\omega_f$ is the low-pass filter cutoff frequency

In FIG. 16, the frequency component extractor 22 in FIG. 15 is changed to a frequency component converter 24, and the low-pass filter $G_F(s)$ is changed to an integrator 23. In other words, the low-pass filter $G_F(s)$ that is inside the frequency component extractor 22 in FIG. 15 is moved to the outside. Furthermore, the integrator 23 is a simple integrator 23 having a cutoff frequency of ωf and the inverse model as the gain, obtained as a result of combining the low-pass filter $G_F(s)$ inside the frequency component extractor 22 with a latter-stage low-pass filter $G_F(s)$. In this way, FIG. 15 can be equivalently converted to FIG. 16. However, the frequency component converter 24 in FIG. 16 uses the following Equation (10).

[Expression 11]

$$T_n^* = 2 \cdot \begin{bmatrix} \cos n\theta \\ \sin n\theta \end{bmatrix} \cdot \Delta\tau \quad (10)$$

Since Equation (10) does not include a low-pass filter $G_F(s)$, the nth-order frequency component vector $T_{pdn}^*$ of the vibrational torque controller output is directly generated without expressly extracting the frequency component of the periodic disturbances contained in the torque deviation Δτ.

According to the present Embodiment 3, when the low-pass filter $G_F(s)$ is limited to being a first-order filter, a generalized periodic disturbance observer for the torque deviation can be realized with an extremely simple configuration comprising only an integrator 23 having ° if as the gain. Therefore, in addition to obtaining the effects of Embodiment 2, the amount of computation associated with control can be further reduced.

Embodiment 4

In the present Embodiment 4, a configuration in which the observer gain is added to the generalized periodic disturbance observer inside the vibrational torque controller 11 will be explained. In FIG. 17, an observer gain Kob is added to the configuration of Embodiment 3. Of course, even with the configurations of the other embodiments, similar effects can be obtained by using a configuration in which the observer gain Kob is added to the inverse model $Q_n$.

Since the observer gain Kob multiplies a gain to the inverse model $Q_n$, an error is actively imparted to the amplitude of the inverse model transfer properties. Normally, the inverse of the control target model $P_n$ is set to be ON and the controller is operated in a state that is matched as closely as possible to the true value in which there is no model error. However, since a generalized periodic disturbance observer has a certain degree of robust stability with respect to model error, it is proposed that the feedback group gain be increased within the range of the robust stability. For example, an example of stability analysis of a generalized periodic disturbance observer is shown in FIG. 18.

FIG. 18 is a numerical example indicating the stability range when, with respect to a control target model (true value) $P_n$, the inverse model $Q_n$ thereof has amplitude error (vertical axis) and phase error (horizontal axis). In this numerical example, it can be seen that a larger amplitude error can be tolerated as the phase error approaches zero, and that instability occurs when the phase error exceeds ±90 degrees.

Additionally, the portion of FIG. 18 indicated by the dotted lines indicates the area where the pole arrangement in the discrete system approaches the closest to the origin (where the quick response is the best). In other words, this means that the quick response during transient changes is improved by setting the phase error as closely as possible to 0 degrees and applying an appropriate degree of observer gain Kob.

In the present Embodiment 4, the robust stability range of the generalized periodic disturbance observer can be used to improve the transient quick response of the vibration waveform tracking control by applying an appropriate degree of observer gain Kob of the feedback loop.

Embodiment 5

In the vibrational torque controller 11 in Embodiments 1-4, the generalized periodic disturbance observer system uses a periodic disturbance suppression controller contributing only a specific frequency component. In the present Embodiment 5, the orders that are to be suppressed are separately designated, and generalized periodic disturbance observers for the respective orders are arranged in parallel. The parallel periodic disturbance compensation values are summed in a compensation signal synthesis unit 19, thereby allowing periodic disturbances in multiple frequency components to be suppressed simultaneously.

Torque ripples are periodic disturbances that occur as a result of electromagnetic non-uniformities in the motor, mechanical imbalances, dead time in the inverter, and current sensor error, as well as other nonlinearities. As the order to be suppressed, for example, the first order, second order, sixth order, twelfth order or the like is designated in terms of the electrical frequency. The orders at which torque ripples tend to occur may be designated in accordance with the structural properties and the number of poles in the motor.

As an example, a configuration in which two of the control configurations in FIG. 13 are arranged in parallel will be explained. As the torque command value τ* and the torque detection value $\tau_{det}$ in the parallel first control configuration and the torque command value τ* and the torque detection value $\tau_{det}$ in the parallel second control configuration, the same values are inputted to the vibrational frequency component extractor 12 and the ripple suppression frequency component extractor 13.

Additionally, the sixth order is set as the suppression target order n of the parallel first control configuration and the twelfth order is set as the suppression target order n of the parallel second control configuration. Therefore, the nth-order rotational phase nθ in the parallel first control configuration and the nth-order rotational phase nθ in the parallel second control configuration are different values.

Furthermore, the value obtained by summing the vibrational torque command value $\tau_{pd}^*$ in the parallel first control configuration and the vibrational torque command value $\tau_{pd}^*$ in the parallel second control configuration is obtained as the output (vibrational torque command value $\tau_{pd}^*$) of the vibrational torque controller 11 in FIG. 5.

Additionally, while vibrational control is used to simulate engine torque pulses, in the four-cycle engines that are often used in commercially available automobiles, the fuel is exploded once for every two revolutions in each cylinder, so a large vibrational torque having a frequency that is the number of cylinders×0.5× rotation speed is generated. Additionally, in consideration of the high-frequency components thereof, the engine vibration waveform may be simulated by designating the second order, the fourth order, the sixth order, the eighth order or the like of the mechanical frequency in a four-cylinder engine.

By arranging generalized periodic disturbance observers for these multiple control target orders in parallel, it is possible to simulate the engine waveform while simultaneously achieving torque ripple suppression.

Embodiment 6

Normally, the distorted waveforms in engine torque are high-frequency components that are generated in synchronization with the engine rotation speed. Thus, as indicated in the above Embodiments 1-5, the vibrational torque controller 11 was formed by using a control system synchronized with the rotational phase detection value $\theta$ ($=\int \omega_m \, dt$).

In a testing device such as a dynamometer, tests are normally performed by means of rotation-synchronized vibrations as mentioned above, but as a special case, it is also possible to implement vibrational control that is not synchronized with the motor rotation.

When doing so, aside from the frequency component of the order synchronized with the rotation used in torque ripple suppression control, a vibrational frequency component that is generated so as not to be synchronized with the rotation is superimposed. In this case, the nth-order rotational phase n$\theta$ is not inputted to the vibrational frequency component extractor 12 in FIG. 13, and a phase $\Theta'$ ($=\int \omega' dt$) that is not synchronized with the nth-order rotational phase n$\theta$ is inputted.

In this case, $\omega'$ is a value that is different from and not synchronized with the motor rotation speed $\omega_m$, which corresponds to the frequency component used for vibrational control. $\omega'$ is obtained by differentiating the phase $\Theta'$. The phase $\Theta$ or $\omega'$ is set separately and independently of the motor rotation speed $\omega_m$.

Under such conditions in which the vibrational frequency component is not synchronized, in the case of a configuration in which two configurations having the control configuration in FIG. 13 are arranged in parallel, as in Embodiment 5 (except that the value of n (hereinafter referred to as n1) in the parallel first configuration is different from the value of n (hereinafter referred to as n2) in the parallel second configuration; the phase $\Theta'$ (hereinafter referred to as $\Theta 1'$) of the vibrational control in the parallel first configuration is different from the phase $\Theta'$ (hereinafter referred to as $\Theta 2'$) of the vibrational control in the parallel second configuration), there is a possibility, depending on the motor rotation speed $\omega_m$, of cases occurring in which the frequency component (n1×$\omega_m$) of the torque ripple suppression control in the parallel first configuration matches with the vibrational frequency component ($\omega 2'=d\Theta 2'/dt$) in the parallel second configuration.

In such cases, the same frequency component will be controlled in both of the control systems that are arranged in parallel, and in some cases, there is a risk of causing control interference.

Therefore, in the present Embodiment 6, limited to cases in which a non-synchronized vibration test is to be implemented, the non-synchronized vibrational frequency components ($\omega 1'$, $\omega 2'$) and the nth-order rotational frequency components, i.e., the torque ripple frequency components (n1×$\omega_m$, n2×$\omega_m$), in the respective parallel control configurations are monitored, and when these frequencies match, the torque ripple suppression control is turned OFF in a control configuration with a matching frequency.

As an example, in the case in which (n1×$\omega_m$) in the parallel first configuration matches with $\omega 2'$ in the parallel second configuration, the torque ripple suppression control is turned OFF in the parallel first configuration. In other words, in FIG. 13, $\hat{U}_n$ is set to zero.

According to the present Embodiment 6, it is possible to prevent control interference with a torque ripple suppression control system when performing non-synchronized vibrational control. Additionally, in the period during which the torque suppression control is turned OFF, the vibrational torque control system also serves the role of torque ripple suppression, so the results of the engine waveform tracking control are not affected.

Embodiment 7

In an actual engine, there are misfiring modes in which the fuel combustion fails. For example, if just one cylinder in a four-cylinder engine misfires, then the engine enters a state in which torque is not outputted once every four times.

In the present Embodiment 7, in order to support engine misfiring modes, a vibrational torque controller 11 is implemented with a generalized periodic disturbance observer in which a decimal order is designated.

For example, when implementing a single-cylinder misfiring mode in a four-cylinder engine, the 0.5-th order and multiples thereof are designated with respect to the mechanical rotation speed.

An example of the effects of the present Embodiment 7 is shown in FIG. 19. The torque drops once every four times, so tracking is possible even when such a vibrational torque command value is applied.

In the disclosed embodiments the low-frequency torque controller, vibrational torque controller and high frequency resonance suppression controller may be performed by one or more microprocessors. The one or more microprocessors may have the aforementioned functions of the low-frequency torque controller, vibrational torque controller and high frequency resonance suppression controller stored on a memory and executable by the one or more microprocessors.

Although only specific examples of the present invention were explained in detail above, it will be clear to a person skilled in the art that various modifications and adjustments are possible within the scope of the technical concept of the present invention, and such modifications and adjustments naturally belong within the scope of the claims.

The invention claimed is:

1. A motor drive system comprising:
   a low-frequency torque controller having PID control for outputting a low-frequency torque controller output based on a torque command value and a torque detection value;
   a vibrational torque controller for outputting a vibrational torque command value based on the torque command value, the torque detection value and a rotational phase detection value; and
   a high-frequency resonance suppression controller for outputting an inverter torque command value based on the torque detection value and a corrected torque command value obtained by adding the low-frequency torque controller output to the vibrational torque command value.

2. The motor drive system according to claim 1, wherein the high-frequency resonance suppression controller has:
- a μ-synthesis controller for adding an output obtained by subjecting the corrected torque command value to transfer properties from a μ-synthesis controller command value input to a μ-synthesis controller output, to an output obtained by subjecting the torque detection value to transfer properties from a μ-synthesis controller detection value input to a μ-synthesis controller output, and outputting an inverter torque command value; and
- the low-frequency torque controller implements PID control.

3. The motor drive system according to claim 1, wherein the vibrational torque controller comprises:
- a vibration frequency component extractor for outputting an nth-order frequency component vector of the vibrational torque command value based on the torque command value and an nth-order rotational phase obtained by multiplying, with the rotational phase detection value, an order n of a torque ripple frequency component and a vibration frequency component to be controlled;
- a ripple suppression frequency component extractor for outputting an nth-order frequency component vector of periodic disturbances based on the torque detection value and the nth-order rotational phase;
- a speed converter for outputting an nth-order rotational frequency based on the nth-order rotational phase;
- a first inverse model multiplication unit for multiplying, with an nth-order frequency component vector of the vibrational torque command value, an inverse model to which a single frequency vector synchronized with the nth-order rotational frequency has been applied, and outputting an nth-order frequency component vector of a vibration-induced periodic disturbance command value;
- a second inverse model multiplication unit for multiplying, with an nth-order frequency component vector of the periodic disturbances, an inverse model to which a single frequency vector synchronized with the nth-order rotational frequency has been applied, and outputting an nth-order frequency component vector of an operation amount estimate value;
- a first subtractor for subtracting, from the nth-order frequency component vector of the operation amount estimate value, a value obtained by passing an nth-order frequency component vector of the vibrational torque controller output through a low-pass filter, and outputting an nth-order frequency component vector of the periodic disturbance estimate value;
- a second subtractor for subtracting, from the nth-order frequency component vector of the vibration-induced periodic disturbance command value, the nth-order frequency component vector of the periodic disturbance estimate value, and outputting an nth-order frequency component vector of the vibrational torque controller output; and
- a compensation signal synthesis unit for outputting the vibrational torque command value based on the nth-order frequency component vector of the vibrational torque controller output and the nth-order rotational phase.

4. The motor drive system according to claim 1, wherein the vibrational torque controller comprises:
- a third subtraction unit for calculating a torque deviation between the torque command value and the torque detection value;
- a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled;
- a speed converter for outputting an nth-order rotational frequency based on the nth-order rotational phase;
- an inverse model multiplication unit for multiplying, with the nth-order frequency component vector of the periodic disturbances, an inverse model to which a single frequency vector synchronized with the nth-order rotational frequency has been applied, and outputting an nth-order frequency component vector of an operation amount estimate value;
- an adder for adding the nth-order frequency component vector of the operation amount estimate value to a value obtained by passing an nth-order frequency component vector of the vibrational torque controller output through a low-pass filter, and outputting the nth-order frequency component vector of the vibrational torque controller output; and
- a compensation signal synthesis unit for outputting the vibrational torque command value based on the nth-order frequency component vector of the vibrational torque controller output and the nth-order rotational phase.

5. The motor drive system according to claim 1, wherein the vibrational torque controller comprises:
- a third subtraction unit for calculating a torque deviation between the torque command value and the torque detection value;
- a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled;
- a speed converter for outputting an nth-order rotational frequency based on the nth-order rotational phase;
- an inverse model multiplication unit for multiplying, with the nth-order frequency component vector of the periodic disturbances, an inverse model to which a single frequency vector synchronized with the nth-order rotational frequency has been applied, and determining an nth-order frequency component vector of an operation amount estimate value;
- an integrator for integrating the nth-order frequency component vector of the operation amount estimate value, and outputting the nth-order frequency component vector of the vibrational torque controller output; and
- a compensation signal synthesis unit for outputting the vibrational torque command value based on the nth-order frequency component vector of the vibrational torque controller output and the nth-order rotational phase.

6. The motor drive system according to claim 1, wherein the vibrational torque controller comprises:
- a vibration frequency component extractor for outputting an nth-order frequency component vector of the vibrational torque command value based on the torque command value and an nth-order rotational phase obtained by multiplying, with the rotational phase detection value, an order n of a torque ripple frequency component and a vibration frequency component to be controlled;

a ripple suppression frequency component extractor for outputting an nth-order frequency component vector of periodic disturbances based on the torque detection value and the nth-order rotational phase;

a speed converter for outputting an nth-order rotational frequency based on the nth-order rotational phase;

a first inverse model multiplication unit for multiplying, with an nth-order frequency component vector of the vibrational torque command value, an inverse model to which a single frequency vector synchronized with the nth-order rotational frequency has been applied, and outputting an nth-order frequency component vector of a vibration-induced periodic disturbance command value;

a second inverse model multiplication unit for multiplying, with an nth-order frequency component vector of the periodic disturbances, an inverse model to which a single frequency vector synchronized with the nth-order rotational frequency has been applied, and outputting an nth-order frequency component vector of an operation amount estimate value;

a first multiplier for multiplying an observer gain with the nth-order frequency component vector of the vibration-induced periodic disturbance command value and outputting a result to a second multiplier;

a second multiplier for multiplying an observer gain with the nth-order frequency component vector of the operation amount estimate value and outputting a result to a first subtractor;

a first subtractor for subtracting, from the output of the second multiplier, a value obtained by passing an nth-order frequency component vector of the vibrational torque controller output through a low-pass filter, and outputting an nth-order frequency component vector of the periodic disturbance estimate value;

a second subtractor for subtracting, from the output of the first multiplier, the nth-order frequency component vector of the periodic disturbance estimate value, and outputting an nth-order frequency component vector of the vibrational torque controller output; and a compensation signal synthesis unit for outputting the vibrational torque command value based on the nth-order frequency component vector of the vibrational torque controller output and the nth-order rotational phase.

7. The motor drive system according to claim 1, wherein the vibrational torque controller comprises:

a third subtraction unit for calculating a torque deviation between the torque command value and the torque detection value;

a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled;

a speed converter for outputting an nth-order rotational frequency based on the nth-order rotational phase;

an inverse model multiplication unit for multiplying, with the nth-order frequency component vector of the periodic disturbances, an inverse model to which a single frequency vector synchronized with the nth-order rotational frequency has been applied, and outputting an nth-order frequency component vector of an operation amount estimate value;

a multiplier for multiplying an observer gain with the nth-order frequency component vector of the operation amount estimate value, and outputting a result to an adder;

an adder for adding the output of the multiplier to a value obtained by passing the nth-order frequency component vector of the vibrational torque controller output through a low-pass filter, and outputting the nth-order frequency component vector of the vibrational torque controller output; and a compensation signal synthesis unit for outputting the vibrational torque command value based on the nth-order frequency component vector of the vibrational torque controller output and the nth-order rotational phase.

8. The motor drive system according to claim 1, wherein the vibrational torque controller comprises:

a third subtraction unit for calculating a torque deviation between the torque command value and the torque detection value;

a frequency component extractor for outputting an nth-order frequency component vector of periodic disturbances based on the torque deviation and an nth-order rotational phase obtained by multiplying, with the rotational phase detection value, an order n of a torque ripple frequency component and a vibration frequency component to be controlled;

a speed converter for outputting an nth-order rotational frequency based on the nth-order rotational phase;

an inverse model multiplication unit for multiplying, with the nth-order frequency component vector of the periodic disturbances, an inverse model to which a single frequency vector synchronized with the nth-order rotational frequency has been applied, and determining an nth-order frequency component vector of an operation amount estimate value;

a multiplier for multiplying an observer gain with the nth-order frequency component vector of the operation amount estimate value and outputting a result to an integrator;

an integrator for integrating the output of the multiplier, and outputting an nth-order frequency component vector of the vibrational torque controller output; and a compensation signal synthesis unit for outputting the vibrational torque command value based on the nth-order frequency component vector of the vibrational torque controller output and the nth-order rotational phase.

9. The motor drive system according to claim 3, having multiple vibrational torque controllers of different orders n; wherein a value obtained by summing the outputs of each of the vibrational torque controllers is used as the vibrational torque command value.

10. The motor drive system according to claim 9 wherein, when the nth-order rotational phase is not inputted to the vibration frequency component extractor and a phase that is not synchronized with the nth-order rotational phase is inputted, unsynchronized vibration frequency components and nth-order rotational frequencies in parallel-stage control structures are separately monitored, and when these frequencies match, the nth-order frequency component vectors of the operation amount estimate values in the control structures in matching stages are set to zero.

11. The motor drive system according to claim 3, wherein the order n of the vibrational torque controller includes decimal numbers.

12. A motor drive system according to claim 1, further comprising:
- a drive motor for simulating engine explosion torque, connected to an input side of a test piece;
- an absorption motor for simulating a load from wheels and a road surface, connected to an output side of the test piece;
- a vibrational controller for outputting a first inverter torque command value based on a torque detection value and a rotational phase detection value of the drive motor;
- a speed controller for outputting a second inverter torque command value based on the motor rotation speed of the absorption motor;
- a drive motor inverter for driving the drive motor based on the first inverter torque command value; and
- an absorption motor inverter for driving the absorption motor based on the second inverter torque command value.

* * * * *